US008295594B2

(12) United States Patent
Brown Elliott et al.

(10) Patent No.: US 8,295,594 B2
(45) Date of Patent: Oct. 23, 2012

(54) SYSTEMS AND METHODS FOR SELECTIVE HANDLING OF OUT-OF-GAMUT COLOR CONVERSIONS

(75) Inventors: Candice Hellen Brown Elliott, Santa Rosa, CA (US); Michael Francis Higgins, Cazadero, CA (US)

(73) Assignee: Samsung Display Co., Ltd. (KR)

( * ) Notice: Subject to any disclaimer, the term of this patent is extended or adjusted under 35 U.S.C. 154(b) by 1058 days.

(21) Appl. No.: 12/242,288

(22) Filed: Sep. 30, 2008

(65) Prior Publication Data

US 2009/0092325 A1 Apr. 9, 2009

Related U.S. Application Data

(60) Provisional application No. 60/978,737, filed on Oct. 9, 2007.

(51) Int. Cl.
*G06K 9/00* (2006.01)

(52) U.S. Cl. ........................................ 382/167; 382/162

(58) Field of Classification Search ........................ None
See application file for complete search history.

(56) References Cited

U.S. PATENT DOCUMENTS

| | | | | |
|---|---|---|---|---|
| 6,023,527 | A * | 2/2000 | Narahara | 382/167 |
| 6,198,843 | B1 * | 3/2001 | Nakauchi et al. | 382/167 |
| 6,954,287 | B1 * | 10/2005 | Balasubramanian et al. | 358/1.9 |
| 7,969,628 | B2 * | 6/2011 | Kim et al. | 358/518 |
| 2005/0083341 | A1 | 4/2005 | Higgins et al. | |
| 2008/0198180 | A1 * | 8/2008 | Langendijk | 345/690 |

FOREIGN PATENT DOCUMENTS

| | | |
|---|---|---|
| WO | WO 2007/004194 | 1/2007 |
| WO | WO 2007/047537 A2 | 4/2007 |

OTHER PUBLICATIONS

Hiroaki Kotera et al. "Object-to-object color mapping by image segmentation", J. of Electonic Imaging, v. 10, 2001.*

Chen, Hanfeng et.al., "Locally Pixel-Compensated Backlight Dimming on LED-Backlight LCD TV", Journal of the SID 15-12, 2007, pp. 981-988.

EP Search Report dated Apr. 3, 2009, European Patent Application No. 08253222.7, 9 pages.

Li, Feng et. Al., "Two Approaches to Derive LED Driving Signals for High-Dynamic-Range LCD", Journal of the SID 15/12, 2007, pp. 989-996.

Lee, Baek-woon et al., 40.5L: Late-News Paper: TFT-LCD with RGBW Color system, SID 03 Digest, 2003, pp. 1212-1215.

Reinhard, Erik et. al., "Image Display Algorithms for High-and Low-Dynamic-Range Display Devices" Journal of the SID 15-12 2007, pp. 997-1014.

* cited by examiner

*Primary Examiner* — Li Liu
(74) *Attorney, Agent, or Firm* — Innovation Counsel LLP

(57) ABSTRACT

Local contrasts within segments of an image are maintained even as the image is gamut mapped to a new gamut space where the remapping, if done straight forward, may result in loss of local contrasts. Display systems described herein use a selective compression unit that first surveys segments of the image to determine which might lose local contrast due to gamut mapping and gamut clamping. Selective compression amounts are determined for respective segments so as to substantially maintain local contrast of the image data within the respective segments.

13 Claims, 30 Drawing Sheets

SYSTEMS AND METHODS FOR SELECTIVE HANDLING OF OUT-OF-GAMUT COLOR CONVERSIONS

RELATED APPLICATION(S)

This patent application claims the benefit of U.S. Provisional Patent Application No. 60/978,737 filed on Oct. 9, 2007, the content of which is incorporated by reference in its entirety.

BACKGROUND

Novel sub-pixel arrangements are disclosed for improving the cost/performance curves for image display devices in the following commonly owned United States Patents and Patent Applications including: (1) U.S. Pat. No. 6,903,754 ("the '754 Patent") entitled "ARRANGEMENT OF COLOR PIXELS FOR FULL COLOR IMAGING DEVICES WITH SIMPLIFIED ADDRESSING;" (2) United States Patent Publication No. 2003/0128225 ("the '225 application") having application Ser. No. 10/278,353 and entitled "IMPROVEMENTS TO COLOR FLAT PANEL DISPLAY SUB-PIXEL ARRANGEMENTS AND LAYOUTS FOR SUB-PIXEL RENDERING WITH INCREASED MODULATION TRANSFER FUNCTION RESPONSE," filed Oct. 22, 2002; (3) United States Patent Publication No. 2003/0128179 ("the '179 application") having application Ser. No. 10/278,352 and entitled "IMPROVEMENTS TO COLOR FLAT PANEL DISPLAY SUB-PIXEL ARRANGEMENTS AND LAYOUTS FOR SUB-PIXEL RENDERING WITH SPLIT BLUE SUB-PIXELS," filed Oct. 22, 2002; (4) United States Patent Publication No. 2004/0051724 ("the '724 application") having application Ser. No. 10/243,094 and entitled "IMPROVED FOUR COLOR ARRANGEMENTS AND EMITTERS FOR SUB-PIXEL RENDERING," filed Sep. 13, 2002; (5) United States Patent Publication No. 2003/0117423 ("the '423 application") having application Ser. No. 10/278,328 and entitled "IMPROVEMENTS TO COLOR FLAT PANEL DISPLAY SUB-PIXEL ARRANGEMENTS AND LAYOUTS WITH REDUCED BLUE LUMINANCE WELL VISIBILITY," filed Oct. 22, 2002; (6) United States Patent Publication No. 2003/0090581 ("the '581 application") having application Ser. No. 10/278,393 and entitled "COLOR DISPLAY HAVING HORIZONTAL SUB-PIXEL ARRANGEMENTS AND LAYOUTS," filed Oct. 22, 2002; and (7) United States Patent Publication No. 2004/0080479 ("the '479 application") having application Ser. No. 10/347,001 and entitled "IMPROVED SUB-PIXEL ARRANGEMENTS FOR STRIPED DISPLAYS AND METHODS AND SYSTEMS FOR SUB-PIXEL RENDERING SAME," filed Jan. 16, 2003. Each of the aforementioned '225, '179, '724, '423, '581, and '479 published applications and U.S. Pat. No. 6,903,754 are hereby incorporated by reference herein in its entirety.

For certain subpixel repeating groups having an even number of subpixels in a horizontal direction, systems and techniques to affect improvements, e.g. polarity inversion schemes and other improvements, are disclosed in the following commonly owned United States patent documents: (1) United States Patent Publication No. 2004/0246280 ("the '280 application") having application Ser. No. 10/456,839 and entitled "IMAGE DEGRADATION CORRECTION IN NOVEL LIQUID CRYSTAL DISPLAYS"; (2) United States Patent Publication No. 2004/0246213 ("the '213 application") (U.S. patent application Ser. No. 10/455,925 ) entitled "DISPLAY PANEL HAVING CROSSOVER CONNECTIONS EFFECTING DOT INVERSION"; (3) U.S. Pat. No. 7,218,301 ("the '301 patent") having application Ser. No. 10/455,931 and entitled "SYSTEM AND METHOD OF PERFORMING DOT INVERSION WITH STANDARD DRIVERS AND BACKPLANE ON NOVEL DISPLAY PANEL LAYOUTS"; (4) U.S. Pat. No. 7,209,105 ("the '105 patent") having application Ser. No. 10/455,927 and entitled "SYSTEM AND METHOD FOR COMPENSATING FOR VISUAL EFFECTS UPON PANELS HAVING FIXED PATTERN NOISE WITH REDUCED QUANTIZATION ERROR"; (5) U.S. Pat. No. 7,187,353 ("the '353 patent") having application Ser. No. 10/456,806 entitled "DOT INVERSION ON NOVEL DISPLAY PANEL LAYOUTS WITH EXTRA DRIVERS"; (6) United States Patent Publication No. 2004/0246404 ("the '404 application") having application Ser. No. 10/456,838 and entitled "LIQUID CRYSTAL DISPLAY BACKPLANE LAYOUTS AND ADDRESSING FOR NON-STANDARD SUBPIXEL ARRANGEMENTS"; (7) United States Patent Publication No. 2005/0083277 ("the '277 application") having application Ser. No. 10/696,236 entitled "IMAGE DEGRADATION CORRECTION IN NOVEL LIQUID CRYSTAL DISPLAYS WITH SPLIT BLUE SUBPIXELS", filed Oct. 28, 2003; and (8) U.S. Pat. No. 7,268,758 ("the '758 patent") having application Ser. No. 10/807,604 and entitled "IMPROVED TRANSISTOR BACKPLANES FOR LIQUID CRYSTAL DISPLAYS COMPRISING DIFFERENT SIZED SUBPIXELS", filed Mar. 23, 2004. Each of the aforementioned '280, '213, '404, and '277 published applications and the '353, '301, '105 and '758 patents are hereby incorporated by reference herein in its entirety.

These improvements are particularly pronounced when coupled with sub-pixel rendering (SPR) systems and methods further disclosed in the above-referenced U.S. Patent documents and in commonly owned United States Patents and Patent Applications: (1) U.S. Pat. No. 7,123,277 ("the '277 patent") having application Ser. No. 10/051,612 and entitled "CONVERSION OF A SUB-PIXEL FORMAT DATA TO ANOTHER SUB-PIXEL DATA FORMAT," filed Jan. 16, 2002; (2) U.S. Pat. No. 7,221,381 ("the '381 patent") having application Ser. No. 10/150,355 entitled "METHODS AND SYSTEMS FOR SUB-PIXEL RENDERING WITH GAMMA ADJUSTMENT," filed May 17, 2002; (3) U.S. Pat. No. 7,184,066 ("the '066 patent") having application Ser. No. 10/215,843 and entitled "METHODS AND SYSTEMS FOR SUB-PIXEL RENDERING WITH ADAPTIVE FILTERING," filed Aug. 8, 2002; (4) United States Publication No. 2004/0196302 ("the '302 application") having application Ser. No. 10/379,767 and entitled "SYSTEMS AND METHODS FOR TEMPORAL SUB-PIXEL RENDERING OF IMAGE DATA" filed Mar. 4, 2003; (5) U.S. Pat. No. 7,167,186 ("the '186 patent") having application Ser. No. 10/379,765 and entitled "SYSTEMS AND METHODS FOR MOTION ADAPTIVE FILTERING," filed Mar. 4, 2003; (6) U.S. Pat. No. 6,917,368 ("the '368 Patent") entitled "SUB-PIXEL RENDERING SYSTEM AND METHOD FOR IMPROVED DISPLAY VIEWING ANGLES"; and (7) United States Patent Publication No. 2004/0196297 ("the '297 application") having application Ser. No. 10/409,413 and entitled "IMAGE DATA SET WITH EMBEDDED PRE-SUBPIXEL RENDERED IMAGE" filed Apr. 7, 2003. Each of the aforementioned '302, and '297 applications and the '277, '381, '066, '186 and '368 patents are hereby incorporated by reference herein in its entirety.

Improvements in gamut conversion and mapping are disclosed in commonly owned United States Patents and co-pending United States Patent Applications: (1) U.S. Pat. No.

6,980,219 ("the '219 Patent") entitled "HUE ANGLE CALCULATION SYSTEM AND METHODS"; (2) United States Patent Publication No. 2005/0083341 ("the '341 application") having application Ser. No. 10/691,377 and entitled "METHOD AND APPARATUS FOR CONVERTING FROM SOURCE COLOR SPACE TO TARGET COLOR SPACE", filed Oct. 21, 2003; (3) United States Patent Publication No. 2005/0083352 ("the '352 application") having application Ser. No. 10/691,396 and entitled "METHOD AND APPARATUS FOR CONVERTING FROM A SOURCE COLOR SPACE TO A TARGET COLOR SPACE", filed Oct. 21, 2003; (4) U.S. Pat. No. 7,176,935 ("the '935 patent") having application Ser. No. 10/690,716 and entitled "GAMUT CONVERSION SYSTEM AND METHODS" filed Oct. 21, 2003. Each of the aforementioned '341, and '352 applications and the '219 and '935 patents is hereby incorporated by reference herein in its entirety.

Additional advantages have been described in (1) U.S. Pat. No. 7,084,923 ("the '923 patent") having application Ser. No. 10/696,235 and entitled "DISPLAY SYSTEM HAVING IMPROVED MULTIPLE MODES FOR DISPLAYING IMAGE DATA FROM MULTIPLE INPUT SOURCE FORMATS", filed Oct. 28, 2003; and in (2) United States Patent Publication No. 2005/0088385 ("the '385 application") having application Ser. No. 10/696,026 and entitled "SYSTEM AND METHOD FOR PERFORMING IMAGE RECONSTRUCTION AND SUBPIXEL RENDERING TO EFFECT SCALING FOR MULTI-MODE DISPLAY" filed Oct. 28, 2003, each of which is hereby incorporated herein by reference in its entirety.

Additionally, each of these co-owned and co-pending applications is herein incorporated by reference in its entirety: (1) United States Patent Publication No. 2005/0225548 ("the '548 application") having application Ser. No. 10/821,387 and entitled "SYSTEM AND METHOD FOR IMPROVING SUB-PIXEL RENDERING OF IMAGE DATA IN NON-STRIPED DISPLAY SYSTEMS"; (2) United States Patent Publication No. 2005/0225561 ("the '561 application") having application Ser. No. 10/821,386 and entitled "SYSTEMS AND METHODS FOR SELECTING A WHITE POINT FOR IMAGE DISPLAYS"; (3) United States Patent Publication No. 2005/0225574 ("the '574 application") and United States Patent Publication No. 2005/0225575 ("the '575 application") having application Ser. Nos. 10/821,353 and 10/961,506 respectively, and both entitled "NOVEL SUBPIXEL LAYOUTS AND ARRANGEMENTS FOR HIGH BRIGHTNESS DISPLAYS"; (4) United States Patent Publication No. 2005/0225562 ("the '562 application") having application Ser. No. 10/821,306 and entitled "SYSTEMS AND METHODS FOR IMPROVED GAMUT MAPPING FROM ONE IMAGE DATA SET TO ANOTHER"; (5) U.S. Pat. No. 7,248,268 ("the '268 patent") having application Ser. No. 10/821,388 and entitled "IMPROVED SUBPIXEL RENDERING FILTERS FOR HIGH BRIGHTNESS SUBPIXEL LAYOUTS"; and (6) United States Patent Publication No. 2005/0276502 ("the '502 application") having application Ser. No. 10/866,447 and entitled "INCREASING GAMMA ACCURACY IN QUANTIZED DISPLAY SYSTEMS."

Additional improvements to, and embodiments of, display systems and methods of operation thereof are described in: (1) Patent Cooperation Treaty (PCT) Application No. PCT/US 06/12768, entitled "EFFICIENT MEMORY STRUCTURE FOR DISPLAY SYSTEM WITH NOVEL SUBPIXEL STRUCTURES" filed Apr. 4, 2006, and published in the United States as United States Patent Application Publication 2008/0170083; (2) Patent Cooperation Treaty (PCT) Application No. PCT/US 06/12766, entitled "SYSTEMS AND METHODS FOR IMPLEMENTING LOW-COST GAMUT MAPPING ALGORITHMS" filed Apr. 4, 2006, and published in the United States as United States Patent Application Publication 2008/0150958; (3) U.S. patent application Ser. No. 11/278,675, entitled "SYSTEMS AND METHODS FOR IMPLEMENTING IMPROVED GAMUT MAPPING ALGORITHMS" filed Apr. 4, 2006, and published as United States Patent Application Publication 2006/0244686 ("the '686 application"); (4) Patent Cooperation Treaty (PCT) Application No. PCT/US 06/12521, entitled "PRE-SUBPIXEL RENDERED IMAGE PROCESSING IN DISPLAY SYSTEMS" filed Apr. 4, 2006, and published in the United States as United States Patent Application Publication 2008/0186325; and (5) Patent Cooperation Treaty (PCT) Application No. PCT/US 06/19657, entitled "MULTIPRIMARY COLOR SUBPIXEL RENDERING WITH METAMERIC FILTERING" filed on May 19, 2006 and published as WO 2006/127555 (referred to below as the "Metamer Filtering application".) Each of these co-owned applications is also herein incorporated by reference in their entirety.

Additional improvements to, and embodiments of, display systems and methods of operation thereof are described in: (1) Patent Cooperation Treaty (PCT) Application No. PCT/US 06/40272, entitled "IMPROVED GAMUT MAPPING AND SUBPIXEL RENDERING SYSTEMS AND METHODS" filed Oct. 13, 2006, and published as WO 2007/047537; (2) Patent Cooperation Treaty (PCT) Application No. PCT/US 06/40269, entitled "IMPROVED MEMORY STRUCTURES FOR IMAGE PROCESSING" filed Oct. 13, 2006, and published as WO 2007/047534; (3) Patent Cooperation Treaty (PCT) Application No. PCT/US 07/79408, entitled "SYSTEMS AND METHODS FOR REDUCING DESATURATION OF IMAGES REDUCED ON HIGH BRIGHTNESS DISPLAYS" filed on Sep. 25, 2007 and published as WO 2008/039764; (4) Patent Cooperation Treaty (PCT) Application No. PCT/US 08/53450, entitled "SUBPIXEL PAYOUTS AND SUBPIXEL RENDERING METHODS FOR DIRECTIONAL DISPLAYS AND SYSTEMS" filed on Feb. 8, 2008; and (5) Patent Cooperation Treaty (PCT) Application No. PCT/US 07/68885, entitled "HIGH DYNAMIC CONTRAST SYSTEM HAVING MULTIPLE SEGMENTED BACKLIGHT" filed on May 14, 2007 and published as WO 2007/143340. Each of these co-owned applications is also herein incorporated by reference in their entirety.

SUMMARY

In one aspect, the invention is a display system for rendering input image data onto a display. The display system includes a display, a selective compression unit, and a gamut mapping unit. The display includes a subpixel repeating group having colored subpixels and a target gamut space, wherein the subpixels have at least four colors. The selective compression unit surveys the input image data to produce intermediate image data. The intermediate image data is a function of a segmentation of the input image according to a parameter. The gamut mapping unit maps the intermediate image data onto image data that is renderable upon the target gamut of the display.

In another aspect, the invention is a display system for rendering input image data onto a display. The display system includes a display, a gamut mapping unit, and a selective compression unit. The display includes a subpixel repeating group having colored subpixels and a target gamut space, wherein the subpixels have at least four colors. The gamut mapping unit maps the input image data onto image data that is substantially renderable upon the target gamut of the display. The selective compression unit surveys the image data to produce intermediate image data, wherein the intermediate image data is a function of a segmentation of the input image according to a parameter.

In yet another aspect, the invention is a method for selectively compressing input image data within an image. The method includes segmenting an image into a set of segments according to a parameter, surveying the input image data within each segment to find the out-of-gamut colors, and determining a reduction amount to apply to each image data value within each segment. The image data value is reduced within the segment by the reduction amount, such that the local contrast of the reduced image data is substantially maintained from the input image data.

In yet another aspect, the invention is a computer-readable medium that includes an encoding for the above method.

DETAILED DESCRIPTION

Gamut Mapping and Out-Of-Gamut Colors

It is well known in the art the need to convert input color image data in one color space and format (typically, conventional RGB converged input color data) that is renderable onto one type of display (e.g. conventional RGB stripe display systems) to another color space and format. Such a display defines a target gamut hull or space for renderable colors and image data. For example, the aforementioned '341, and '352 applications, PCT/US06/40272, and the '219 and '935 patents which are hereby incorporated by reference all describe the systems and methods for effecting such conversions (e.g. from RGB to RGBW color space or some other multiprimary color space) for rendering onto display systems comprising display panels constructed with novel subpixel repeating patterns—for example, subpixel layouts and repeating patterns as shown in the aforementioned '574 and '575 applications.

When such conversions take place, it is also known that certain bright saturated colors may tend to go out of gamut—which may be due at least in part to the different gamut hulls available to render colors for displays of a conventional nature (e.g. RGB stripe) as compared with displays of another subpixel layout (e.g. RGBW displays of a novel subpixel layout). It is desired that such Out-of-Gamut (OOG) colors be handled deftly and in a manner that eliminates or substantially reduces any noticeable visual artifacts.

One technique for handling OOG colors may be to compress colors to "black" to bring them back into gamut before, during, or after the color conversion. For any particular compression scheme, it may be desirable to maintain the local contrast of the colors in the image. Local contrast would tend to ensure that bright saturated colors being compressed maintain a similar treatment as to their luminance, so as not to create any noticeable visual artifact. To maintain local contrast, prior art systems may use scaling that compress to black all of the colors of a given saturation by the same ratio.

Figure 1A:
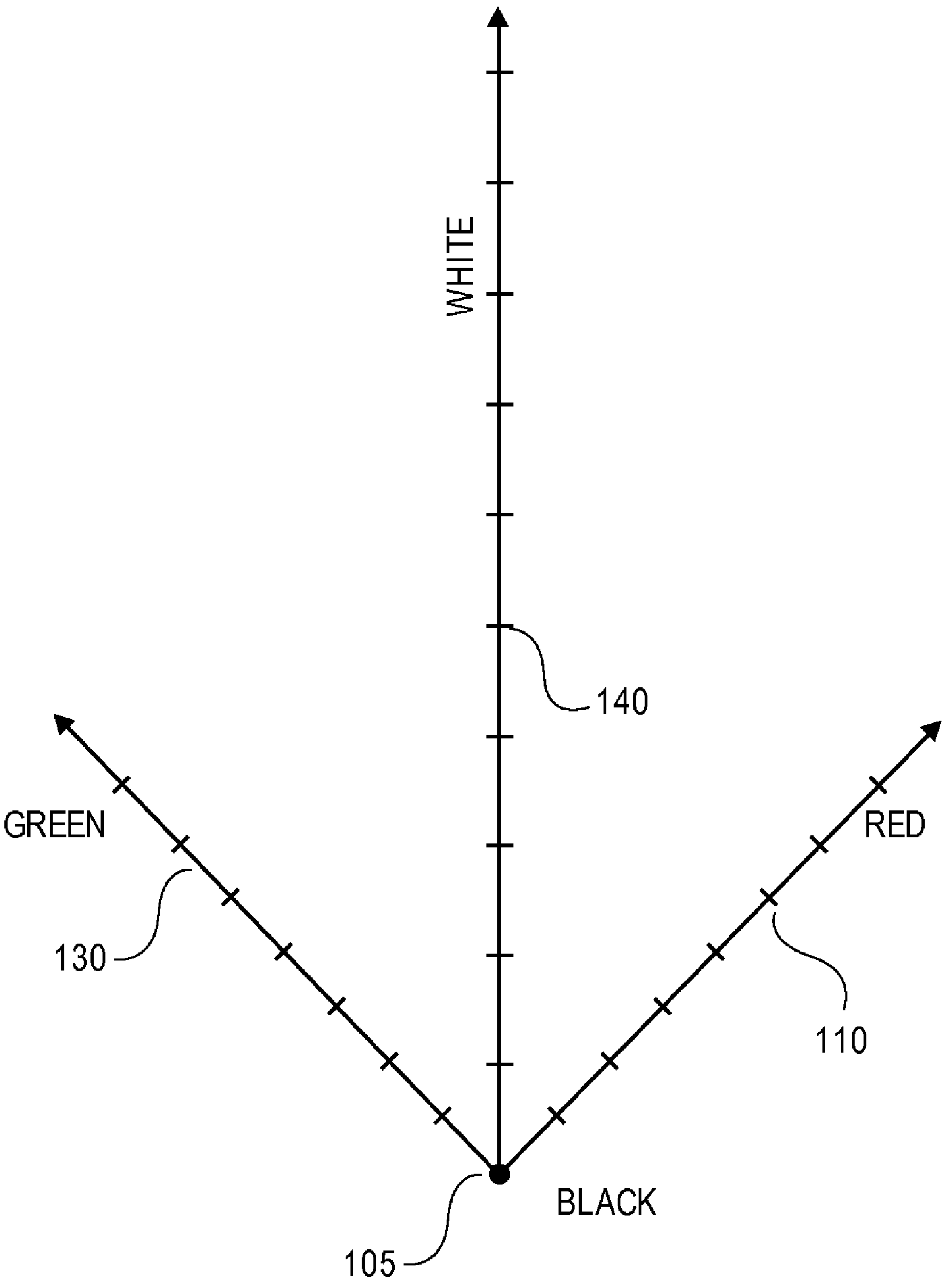
FIG. 1A is a diagram of a color vector space.

FIG. 1A shows an exemplary color space diagram consisting of three vector scales, red 110, green 130, and white 140, originating at black 105. This can be viewed as the result of a two primary display consisting of red and green primary pixels or subpixels. It may also be viewed as a projection of a three primary display consisting of red, green, and blue primary pixels or subpixels in which the color space is projected onto the red/green color plane, the blue color vector projection lying coincidently with the white color vector projection. It may yet also be viewed as the result of a three primary display consisting of red, green, and white primary pixels or subpixels. Or it may be viewed as the result of a four primary display consisting of red, green, blue, and white primary pixels or subpixels in which the color space is projected onto the red/green color plane, the blue color vector projection lying coincidently with the white color vector projection.

Figure 1B:
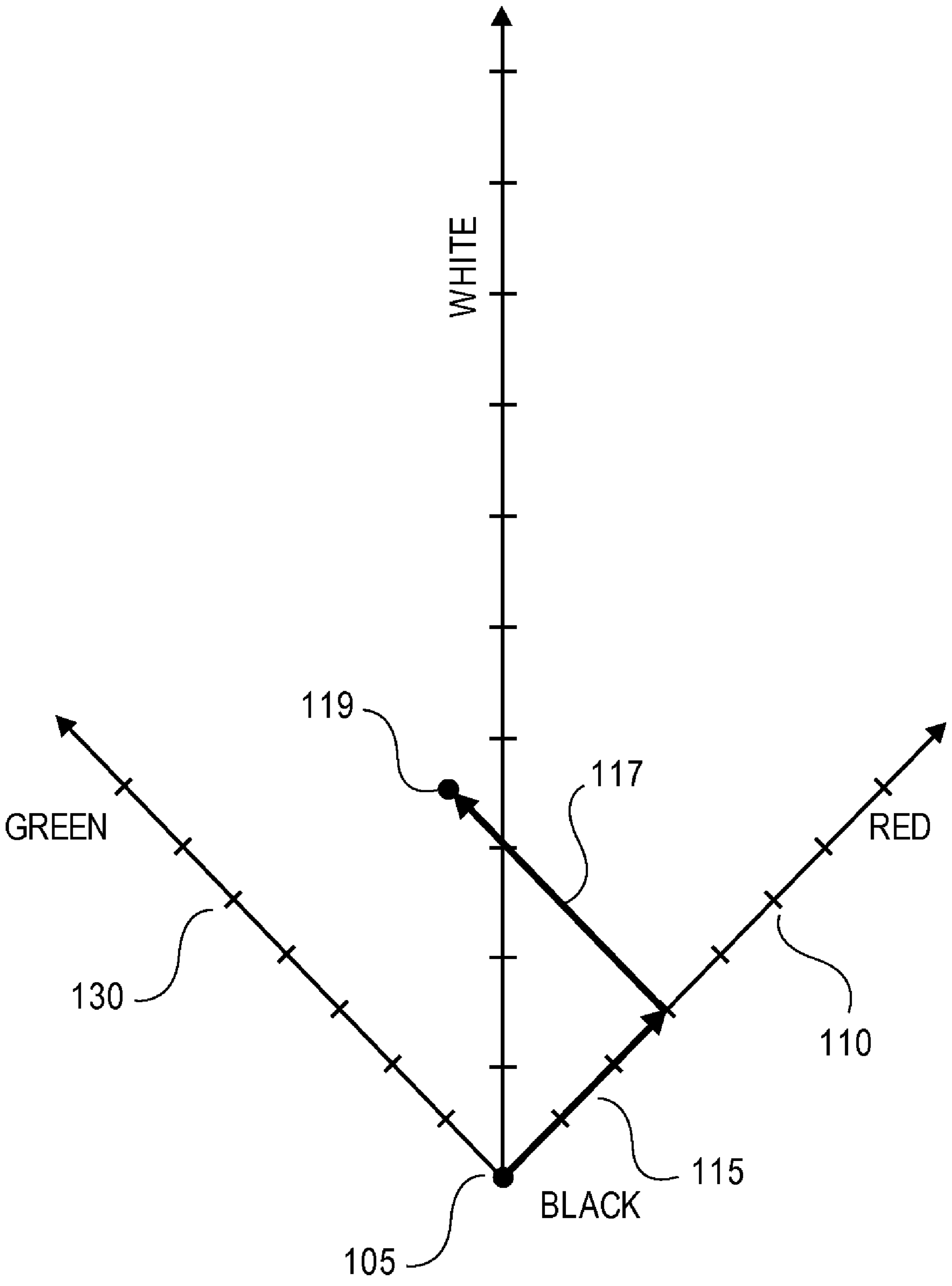
FIG. 1B shows the diagram of FIG. 1A and the vector addition of two color vectors reproducing a given color.

FIG. 1B shows how two primary vectors, red 115 and green 117 may by vector addition result in a unique color point 119. It will be understood by those in skilled in the art that a three color vector addition of red, green, and blue will also result in a unique color point in a three dimensional color space that may be projected onto the red/green color plane of FIG. 1B. Conversely, to reach a given point 119 there will be one and only one set of vectors red 115 and green 117 that may by vector addition reach the point 119 since the red 115 and green 117 vectors are orthogonal to each other. In the example given in FIG. 1B, the red vector 115 is three units of red energy along the red axis 110, while the green vector 117 is four units of green energy along the green axis 130. Thus the resulting color point 119 can be said to have a red/green color space coordinate of "3,4".

Figure 1C:
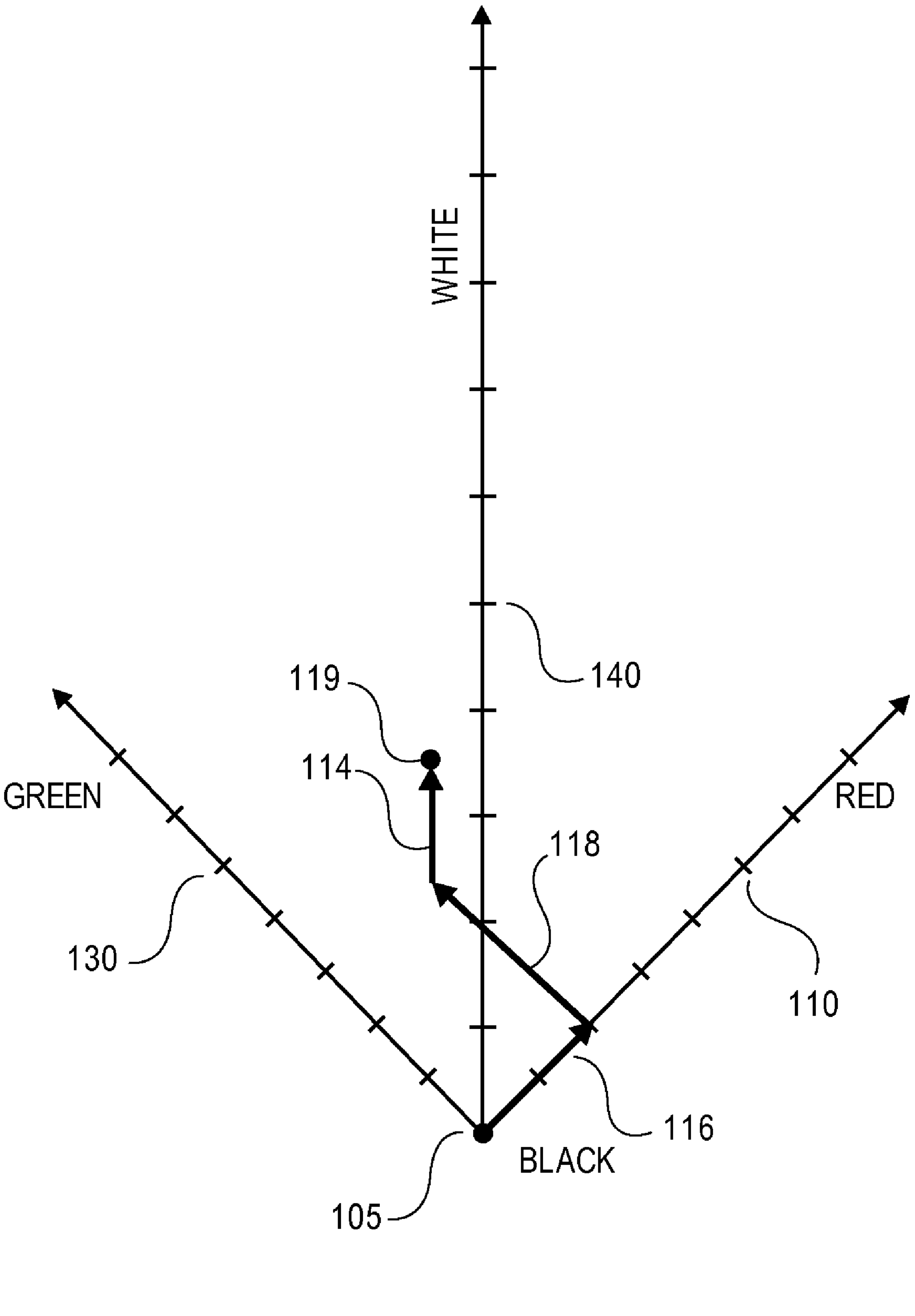
FIG. 1C shows the diagram of FIG. 1A and the vector addition of three color vectors reproducing the same said color in FIG. 1B.

FIG. 1C shows how three primary vectors, red 116, green 118, and white 114 may by vector addition result in a unique color point 119. In the example given in FIG. 1C, the red vector 116 is two units of red energy along the red axis 110, the green vector 118 is three units of green energy along the green axis 130, while the white vector is one unit of white along the white axis. However, the white vector may be decomposed into red and green vector components of one unit of energy each. The resulting color point 119 can be said to have a red/green color space coordinate of "3,4". Note that to reach a given color point 119, many possible combinations of red 116, green 118, and white 114 vectors may be used. Each of these combinations of color vectors is called a metamer for that given color point. It will be understood by those in skilled in the art that a four color vector addition of red, green, blue, and white will also result in a unique color point in a three dimensional color space that may be projected onto the red/green color plane of FIG. 1C, that the concepts explained herein may be extended to include such "RGBW" systems. Methods of finding such RGBW metamers and their uses in color and subpixel rendering are explained in PCT/US06/19657 referenced above and incorporated herein by reference.

Figure 2:
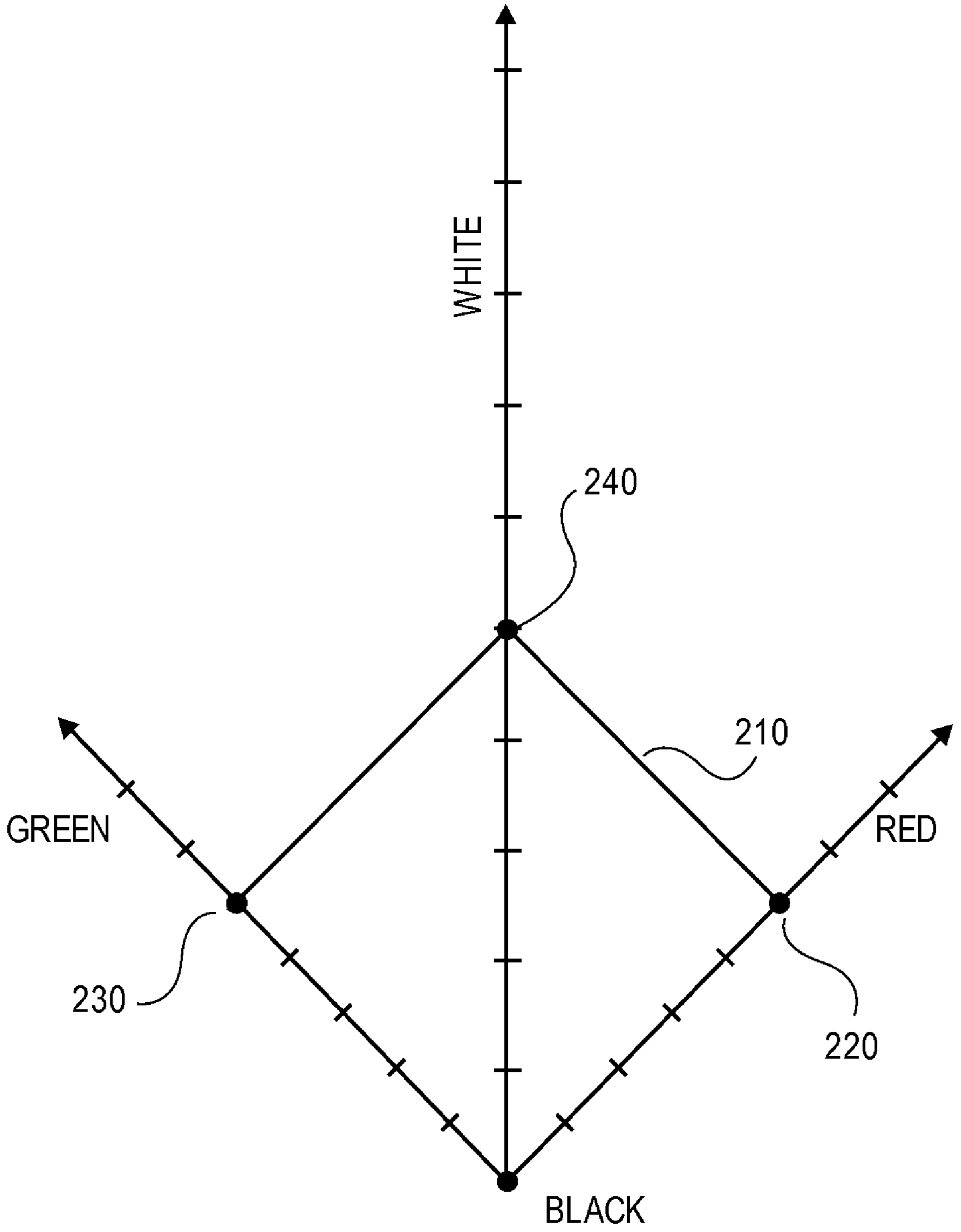
FIG. 2 shows the diagram of FIG. 1A and the color gamut hull formed by the vector addition of two color vectors with equal maximum value.

FIG. 2 shows the resulting color/brightness gamut 210 of a red/green color display with color primary vectors that may reach five units maximum. It may also be viewed as the resulting color/brightness gamut 210 of a red/green/blue color display projected onto the red/green color plane with the blue color vector projected coincidently onto the white axis. The maximum saturated red color 220 forms one corner while the maximum green saturated color 230 forms another corner of the color gamut. When all of the colored primaries, the red, green, blue (not shown for clarity) primaries, are turned on to their maximum value of five units the result is the maximum desaturated color, white, results with a value of five units 240. It should be appreciated that the choice of units is arbitrary in this figure and is used only for explanatory convenience. This red, green, and blue color space is the basis for the RGB color space which is well known in the art.

Figure 3A:
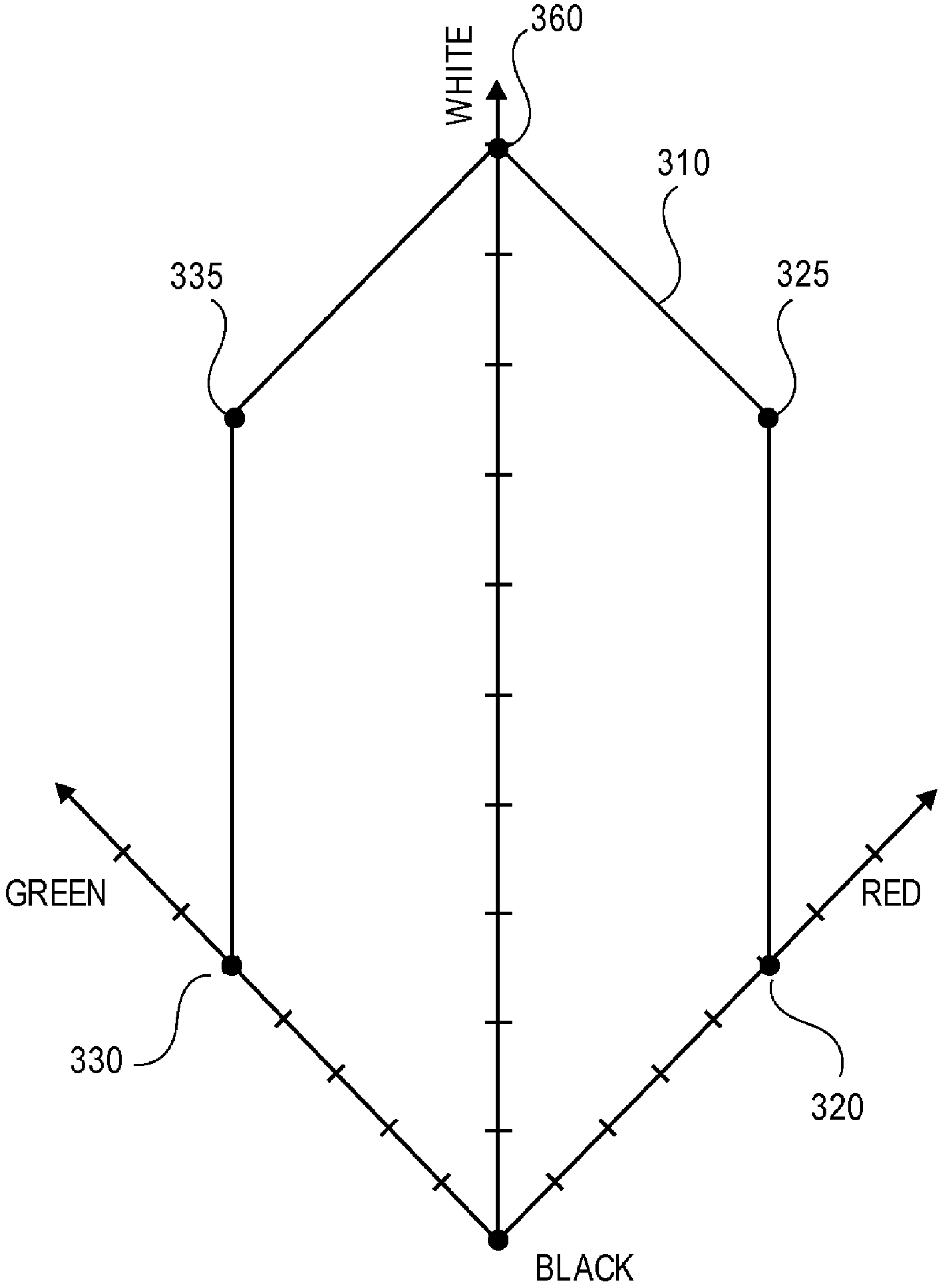
FIG. 3A shows the diagram of FIG. 1A and the color gamut hull formed by the vector addition of three color vectors with equal maximum value.

FIG. 3A shows an exemplary resulting color/brightness gamut 310 of a red/green/white display with color primary vectors that may reach five units maximum. It may also be viewed as the resulting color/brightness gamut 310 of a red/green/blue/white color display projected onto the red/green color plane with the blue color vector projected coincidently onto the white axis. This figure assumes the maximum saturated red color 320 forms one corner while the maximum green saturated color 330 forms another corner of the color gamut. When all of the colored primaries, the red, green, blue (not shown for clarity) and white primaries, are turned on to their maximum value of five units the result is the maximum desaturated color, white, results with a value of ten units 360. The color gamut 310 has additional corners that result from the vector addition of red and white primaries 325 as well as the vector addition of green and white 335. The space inside of the color gamut 310 may be formed from a number of metameric vector combinations of red, green, and white (or red, green, blue, and white for an RGBW system) values.

Figure 3B:
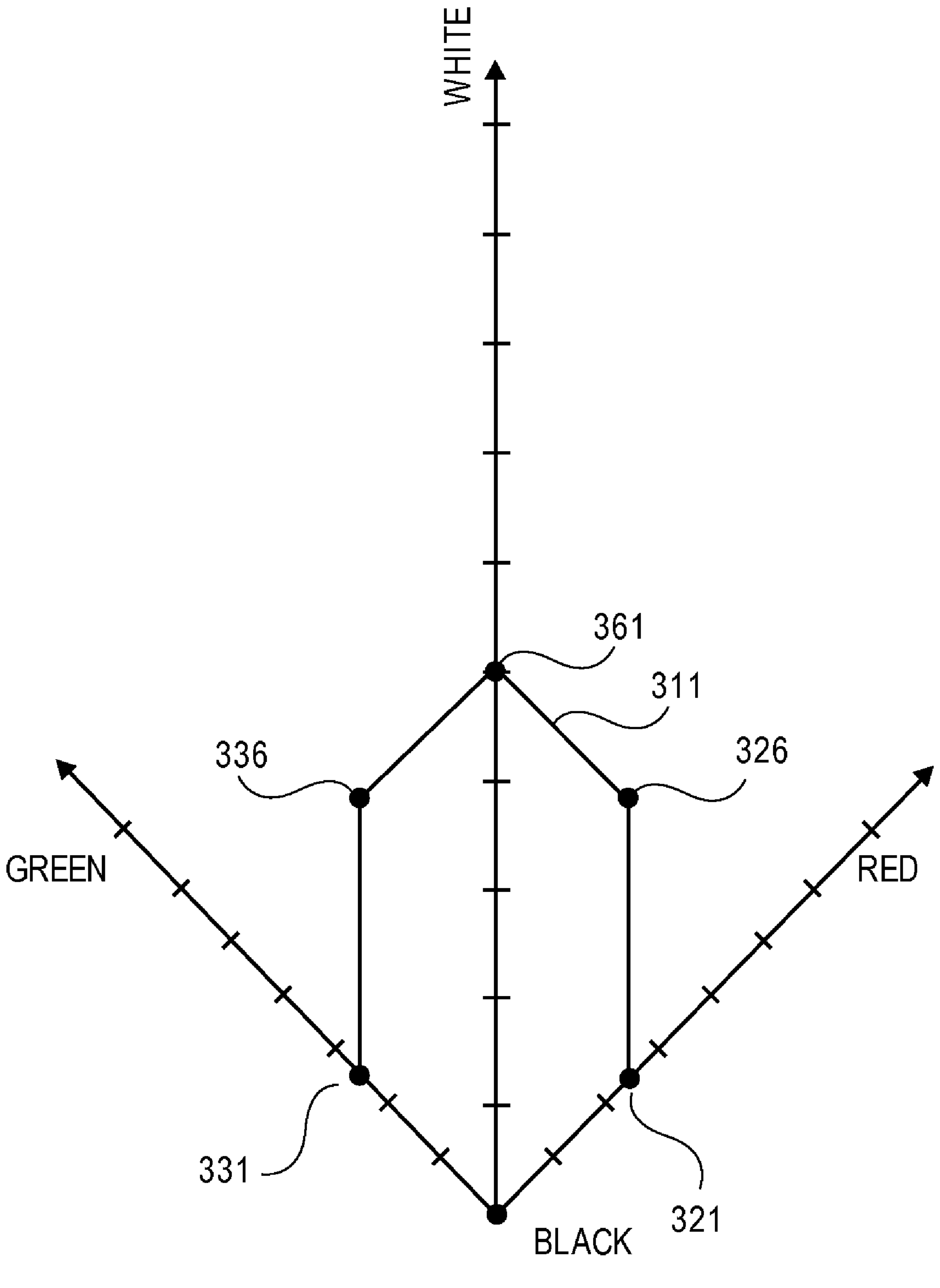
FIG. 3B shows the diagram of FIG. 1A and the color gamut hull formed by the vector addition of three color vectors with half of the value of those shown in FIG. 3A.

It should be note that, in this exemplary figure, the maximum value of the color gamut 310, of the red/green/blue/white display, at ten units of white, is twice that of the red/green/blue display of FIG. 2 at only five units. Thus, for a given specified maximum white brightness required for a given display the backlight energy may be reduced to half that for an RGBW compared to an RGB display. FIG. 3B shows the resulting color/brightness gamut 311 of such an RGBW display that has the backlight reduced by half, resulting in the primaries each having half their previous values. The maximum saturated red 321 and green 331 are two and half (2.5) units. The additional corners that result from the vector addition of red and white primaries 326 as well as the vector addition of green and white 336 are each reduced in half. The maximum white point 361 value is reduced in half at five units.

Figure 3C:
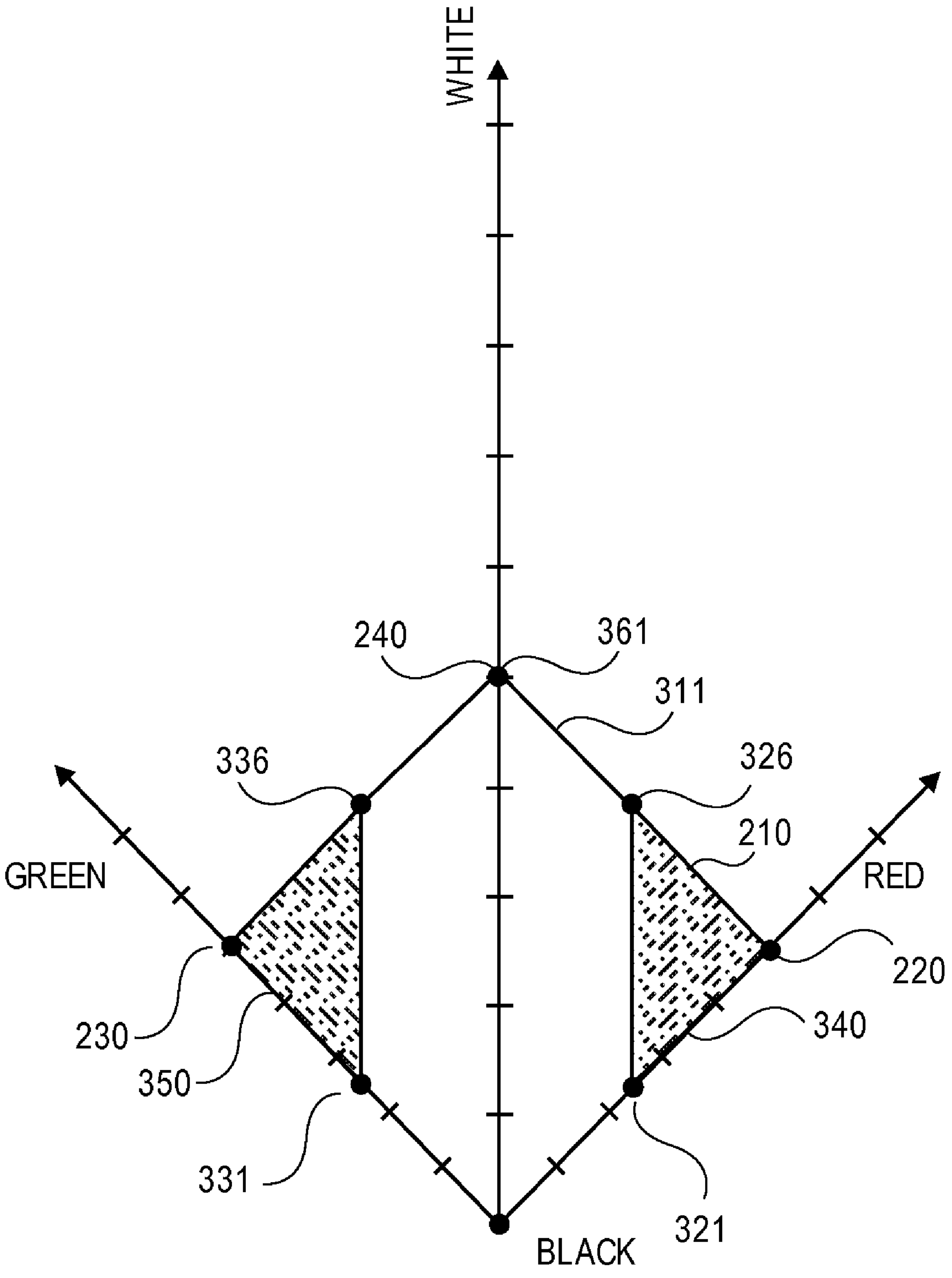
FIG. 3C shows the diagram of FIG. 1A and the half sized gamut hull of FIG. 3B overlaid onto the color gamut hull of FIG. 2, showing that the maximum white value is identical while the brighter saturated colors of the gamut hull of FIG. 2 are not reproduced by the half sized gamut hull of FIG. 3B.

FIG. 3C shows the color gamut 311 of the reduced brightness RGBW of FIG. 3B superimposed on the RGB color/brightness gamut 210 of FIG. 2. It should be noted that the maximum RGBW value 361 is substantially the same as the maximum RGB value 240. Thus for substantially monochromatic (black&white) images, the reduced RGBW gamut 311 should allow for faithful color and brightness reproduction. However, it should be noted that there are some colors 340 & 350 that are in the color/brightness gamut 210 of the RGB display that may not be reproduced in the RGBW color/brightness gamut 311. These missing colors 340 & 350 tend to be the bright saturated colors. Many techniques for handling OOG colors are known in the art and some techniques of gamut mapping these missing "Out-Of-Gamut" (OOG) colors 340 & 350 to the available RGBW gamut 311 are also disclosed in co-owned PCT/US06/40272 application. The techniques, systems and methods of the present embodiments improve on such known techniques, systems and methods of mapping these OOG colors in such a manner that local contrast may be better maintained. In addition, the present techniques may not "punish" other colors that are either less OOG or not OOG.

Figure 3D:
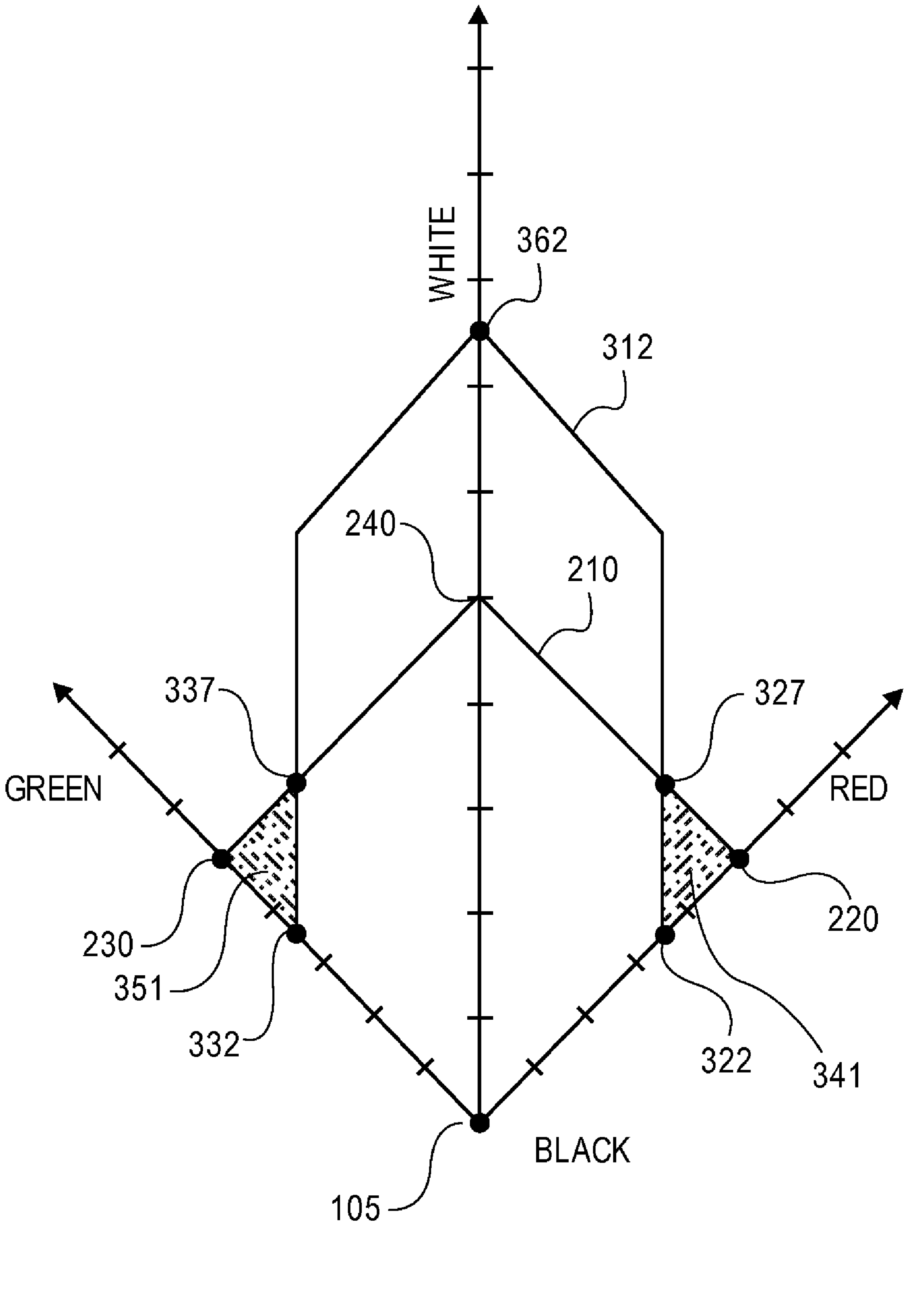
FIG. 3D shows the diagram of FIG. 1A in which white point selected for the RGBW is intermediate between the maximum white point and the half-max white point overlaid onto the color gamut hull of FIG. 2 while fewer brighter saturated colors of the gamut hull of FIG. 2 are not reproduced than shown in FIG. 3C.

FIG. 3D shows a color gamut 312 of a reduced brightness RGBW of FIG. 3B superimposed on the RGB color/brightness gamut 210 of FIG. 2. FIG. 3D differs from FIG. 3C in that the selected white point 362 is intermediate between the maximum white point and the half-maximum white point 240. It may be desirable to select such an intermediate white point, as the amount of OOG colors in regions 351 and 341 are seen to be reduced over similar regions 350 and 340 in FIG. 3C. It should be appreciated that there are many possible white points that may be selected as the intermediate white point which may be manually selected by a user or alternatively selected by the system depending upon the particular color points residing within a given image.

Figure 4A:
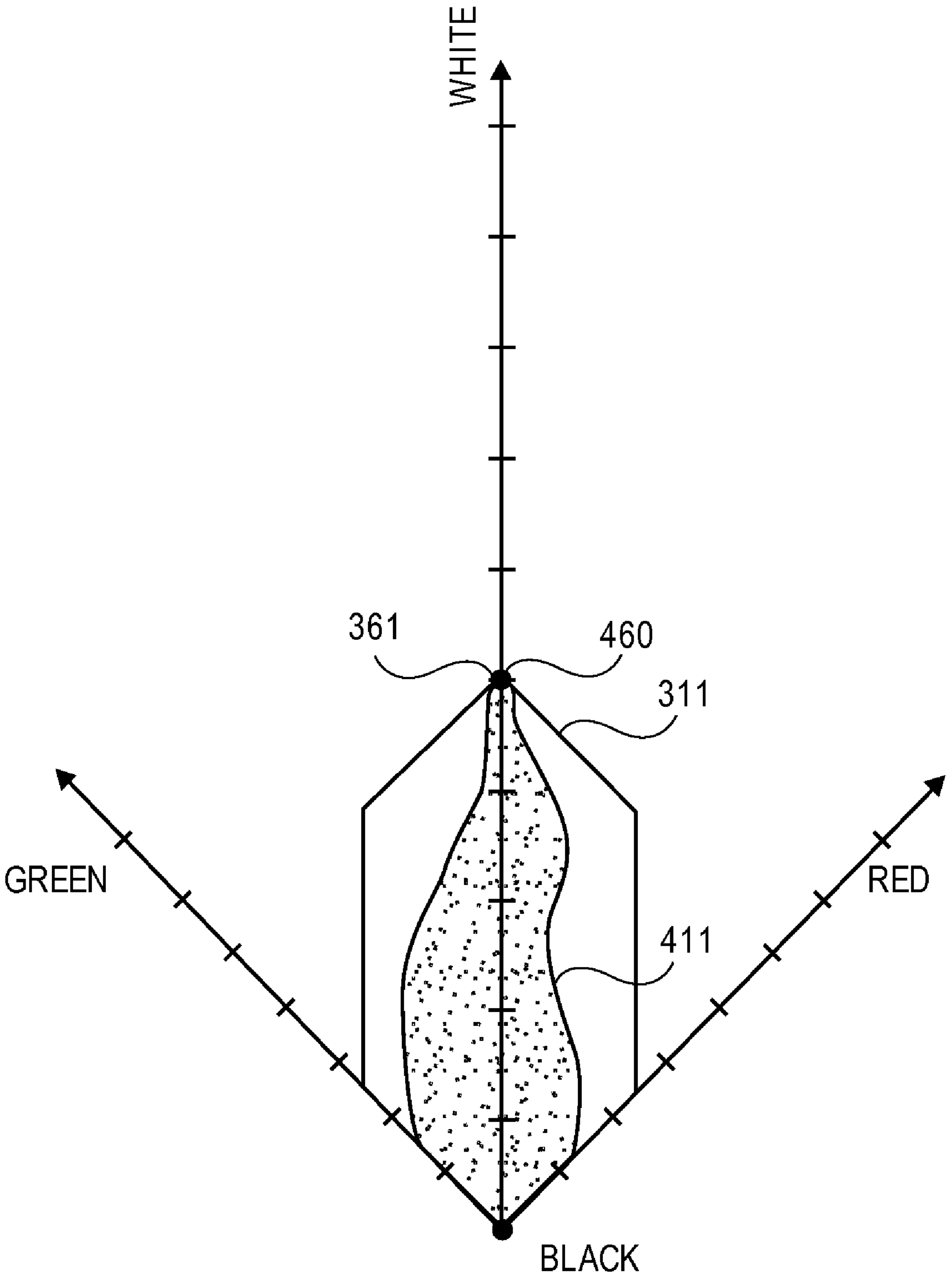
FIG. 4A shows the diagram of FIG. 1A and the half sized gamut hull of FIG. 3B overlaid onto the color brightness gamut of a representative image that has full brightness white colors but no bright saturated colors, fitting inside of the available gamut hull.

Given further exposition, FIG. 4A shows the RGBW color/brightness gamut 311 fully enclosing a color/brightness output gamut 411 of merely one exemplary image to be displayed. In this example, the brightest white 460 of the image is identical to the brightest white 361 of the RGBW gamut. Since all of the colors used in the image fall within the color/brightness gamut 311 of the RGBW display with its half power backlight, no OOG mapping or backlight adjustment would be needed. In contrast, as seen in examining FIG. 4B, the brightest saturated color luminances (e.g., the maximum saturated RED output) falls within gamut portions such as 440 & 450 of the color/brightness output gamut 411 which exceed the boundaries of the RGBW color/brightness gamut 311.

Figure 5A:
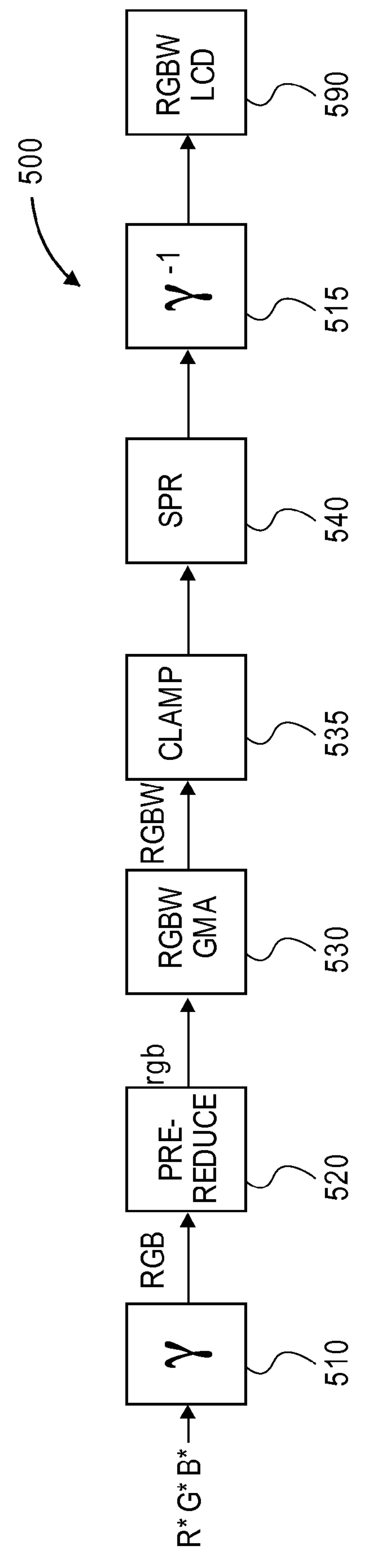
FIG. 5A shows one embodiment a block diagram of a subpixel rendered RGBW or multiprimary display system comprising a pre-reduce module.

Attention is now drawn to one embodiment of a system as shown in the block diagram 500 in FIG. 5A. Perceptually quantized R*G*B* data of a given binary bit depth is linearized by the Gamma function 510, possibly by a Look-Up Table (LUT) to be a greater binary bit depth linearly encoded RGB signal. Because of the need to map colors from the RGB color space to the differently shaped RGBW color/brightness gamut, the RGB color data values are adjusted in the PreReduce function 520 using methods as disclosed further below are as discussed in co-owned PCT/US06/40272 application. The adjusted RGB color data is converted to RGBW color data in the RGBW GMA 530 function block, possibly using any one of the methods disclosed in many of the applications and patent referenced above.

Depending on the adjustments made in the PreReduce function 520, the resulting RGBW color data may include OOG colors. These possible OOG colors may be clamped to the RGBW color/brightness gamut hull in the Clamp function 535. The clamping operation may be 'clamp-to-luminance', 'clamp-to-black', or 'clamp-diagonal' using methods as is described in PCT/US06/40272 (published as WO2007047537) and herein incorporated by reference. The clamped RGBW data may be optionally subpixel rendered by the SPR function 540 possibly using methods disclosed in many of the above referenced applications and patents above. It will be appreciated that the current techniques may be applied in systems that are whole pixel rendered and not subpixel rendered. Because the target LCD 590 may have a non-linearly quantized electro-optical transfer function, the linear subpixel rendered data is non-linearly quantized to match the LCD by the Inverse Gamma function 515. This function may or may not be the inverse of the input Gamma function 510.

Pre-Reduction Algorithms

One possible side effect of RGB to RGBW GMAs may be to reduce the total number of color states that a display system can produce. It may be possible that as many as half of the total number of input colors are mapped onto other colors. This might tend to happen to colors that are both high-brightness and high saturation at the same time, a combination that does not typically occur in natural and unmodified images. However, it might be desirable to have a mode where the total number of colors output by our GMA matches the number of colors that arrive. As noted above, pre-reduction is one way to accomplish this.

In the case where the RGB gamut is essentially scaled until the input RGB white point is mapped onto the RGBW white point. The high brightness+high saturation colors in the shaded areas become out-of-gamut and may be mapped to allowed RGBW values using clamp-to-black, clamp-to-luma, clamp-diagonal or other algorithms. By a pre-reduction of the input values, eventually the entire RGB gamut may fit inside the RGBW gamut. In such a case, it may obviate the step of OOG mappings. Although the resulting images may not be as bright as before, there may actually be more total output states used. Not all possible W values may be used, but all possible RGB output values may be, which may not be the case when some colors are OOG.

In the case of some layouts, pre-reducing the input values by one half may make the RGB gamut fit inside the RGBW gamut. Reducing by other desired amounts may be desirable for layouts when the brightness of the W sub-pixel may not exactly equal the brightness of the other 3 sub-pixels. Also, pre-reducing by desired amounts smaller than one half may increase the total number of output states somewhat, even though some colors will still go OOG. Even in displays with the W sub-pixel brightness equal to the other three primaries, this procedure may increase the brightness of the image and be desirable.

In one embodiment, the input RGB values may be pre-reduced until no OOG values result. Then the normal RGBW GMA may be used to convert to RGBW. Finally, the W values may be scaled up by an amount that makes the largest W value (usually from bright saturated colors near white) hit the maximum value. In one case, the input RGB values have been pre-reduced by half, and then the resulting W values have been scaled up by a factor of 2. This may result in a maximum brightness of about 75% of the maximum possible. Other combinations may produce brighter maximum values, for example reducing the input by a percentage smaller than one half. However, these combinations may produce more OOG colors and decrease the total number of output states.

A Pre-reduction module may be implemented between an input gamma module and GMA module. In such an embodiment, a percentage may be stored as a fixed point binary number in a Pre-reduce register. The pre-reduce register may be 8 bits big and may store a number between 0 and 255, representing a fixed point number between 0 and approximately 0.996. Each of the input RGB values after input gamma may be multiplied by the pre-reduce value, then divided by 256 in right shift modules (e.g. >>8).

In another embodiment, instead of using a multiplier, the input values may be shifted right by different amounts, and the results are added together in different combinations to produce 100% of the input (no reduction), 75% (25% reduction), 62.5%, 50% 37.5% 25% and 12.5%. Instead of storing a fixed point binary number in the pre-reduce register, an index may be stored that selects one of the pre-calculated percentages using a MUX. This set of percentages is only one example. By adding more shifters, adders, and a wider multiplexor, any number of selectable reduction percentages can be produced.

Saturation-Based Pre-Reduction

As another alternate embodiment of pre-reduction, the input RGB values may not be reduced by a fixed amount, but instead by an amount that is a function of saturation. A function which has values near 1.0 when saturation is near zero may have the advantage of mapping the input RGB white value approximately to the output RGBW white value. This may be advantageous over the pre-reduction algorithms above where the maximum possible white value may not be achieved. In another embodiment, the maximum value may be less than 1.0 to reduce simultaneous luminance contrast error. The functions of saturation may decrease to some percentage (Pmax) when saturation is at a maximum. If this Pmax value is larger than the ratio of the brightness of W to the sum of the brightness of the R+G+B subpixels in the display, then there may be some OOG colors. Thus, a gamut clamping module as described above may still be desirable.

One possible curve for this saturation function is a Gaussian, but this may be computationally difficult to implement in hardware. A straight line may be adequate, and a piecewise linear function may also produce pleasing images. The values from this function are multiplied by the input RGB values. Thus, multiplying by 1.0 causes no reduction of the input values with low saturation and multiplying by Pmax or other fractions less than one will result in decreasing input values that have high saturation. All these multiplications by fractional values may be implemented in hardware by multiplying by fixed point binary numbers followed by appropriate right shifts. Other means of implementing multiplication by shifts and adds are also included as part of the scope of the present invention.

Saturation may be considered the perpendicular distance away from the line of grays, typically scaled to range from 0 to 1.0 at the surface of the gamut. Although any number of calculations of saturation could be used, there are approximations to calculating this number which are well known in the industry, for example;

$$\text{Saturation}=(\max(r,g,b)-\min(r,g,b))/\max(r,g,b)$$

The resulting saturation value may then used to generate one of the curves. The piecewise linear line, for example, with a Pmax value of 0.75 may be generated by the following equation:

$$\text{Pre\_reduce}=\min(1,1-((\text{Saturation}-0.25)/(1-0.25)))$$

Then the input red green and blue values may be each multiplied by such a Pre_reduce value, as generated by any of the above embodiments:

$$R=R^{*}\text{Pre\_reduce}$$

$$G=G^{*}\text{Pre\_reduce}$$

$$B=B^{*}\text{Pre\_reduce}$$

Finally, these RG and B values may be run through a GMA algorithm to convert RGB to RGBW. Other embodiments of a pre-reduce function are discussed in WO 2007/047537 and incorporated herein by reference.

In yet another embodiment, the pre-reduction function may also be made a function of hue. Faces and other skin tones, for example, have a very narrow range of hue and it may be advantageous to use a different pre-reduction function on images with these features. In yet another embodiment, the pre-reduction saturation function may also be made a function of brightness. So for a given saturation value, rather than using a constant scaling value, one would scale based on the proximity to BLACK. This would act like a gamma function, and it allows one to shift the output pixel distribution closer (or farther) to the RGBW gamut hull. It should also be appreciated that the pre-reduction function could be based as a function of some combination of hue, saturation and brightness.

In the discussion above, one embodiment might have only one pre-reduction function for all primaries. It may be desirable, however, to have a separate pre-reduction function for each (or a subset) of the input R G and B primaries. This could add the ability to do color correction or adjust the white point of the display.

It is possible to place pre-reduction in many places in the image processing system, such as before an input gamma module. Because the values before input gamma typically have a smaller bit-size, this may have the advantage of decreasing the gate count of hardware based on this design. In addition, it is possible to combine the pre-reduction functions with the input gamma function, performing the gamma correction and the pre-reduction in one step. Because the input gamma function is often implemented as a look-up-table that is pre-calculated, it may then be possible to use other algorithms, such as a Gaussian curve without paying a penalty in more complicated hardware.

It should be appreciated that FIG. 5A is merely one embodiment of a system that may implement the techniques of the present application. In particular, the LCD 590 might be suitably substituted with any type of multiprimary display comprised of a subpixel repeating group further comprised of other primary colors (e.g.—RGBY, RGBC, RGBWY, RGBWC, RGBWM or the like and as disclosed in many applications incorporated herein by reference).

In addition, the current techniques work in systems that employ a unitary backlight (e.g. a CCFL or LED backlight that give either steady illumination or may be modulated) or an array of backlight elements (e.g. CCFL units, LED elements that may be independently addressable). One example of the latter type of display system is depicted in U.S. Pat. No. 6,608,614 B1 entitled "Led-based LCD backlight with extended color space" and in US 2005/0162737 A1, entitled "High Dynamic Range Display Devices"—both of which are incorporated herein in their entirety.

Gamut Compression to Treat OOG Colors

Figure 6A:
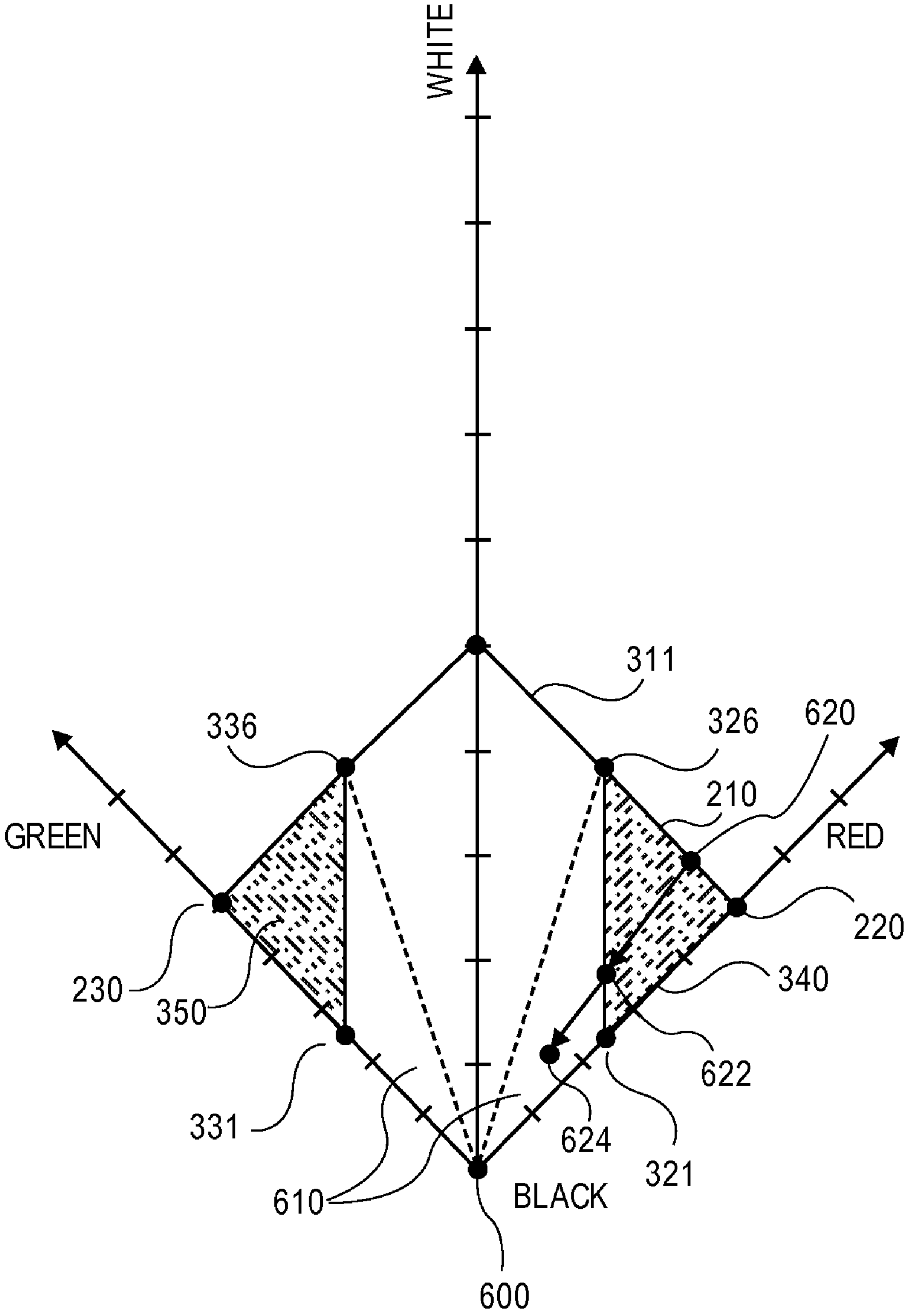
FIG. 6A (PRIOR ART)
FIG. 6A shows the diagram of 1A and the half sized gamut hull of FIG. 3B overlaid onto the color gamut hull of FIG. 2, showing OOG colors of FIG. 3C being scaled down into the available gamut hull.

Turning attention to the diagram in FIG. 6A, there is shown the diagram of FIG. 3C with the color gamut 311 of the reduced brightness RGBW of FIG. 3B superimposed on the RGB color/brightness gamut 210 of FIG. 2. As previously noted, the colors 340 & 350 that are in the color/brightness gamut 210 of the RGB display may not be reproduced in the RGBW color/brightness gamut 311. These missing colors 340 & 350 are the bright saturated colors. These colors may be mapped into the available color gamut. The colors to which these OOG colors are mapped to are themselves mapped to darker states and so on down to the darkest colors. For example, a bright nearly saturated color 620 at the input gamut hull 210 may be scaled down to a color 622 at the available gamut hull 311. The color originally at that new color point 622 on the available gamut hull 311 may be scaled down by the same proportion to a new color point 624 in side of the available gamut hull 311. Thus all of the mid to high saturation colors 610 that are situated in the triangles formed from black 600 to the brightest high saturation 220 and 230 to the brightest mid-saturation 326 and 336 respectively, may be scaled, darkened, toward black. The colors may be scaled in such a manner that the hue and saturation are maintained while only the luminance is reduced. For example, the brightest, most saturated colors such as bright red 220 and bright green 230 may be reduced in brightness to new points of mid-brightness red 321 and mid-brightness green 331 respectively.

Figure 6B:
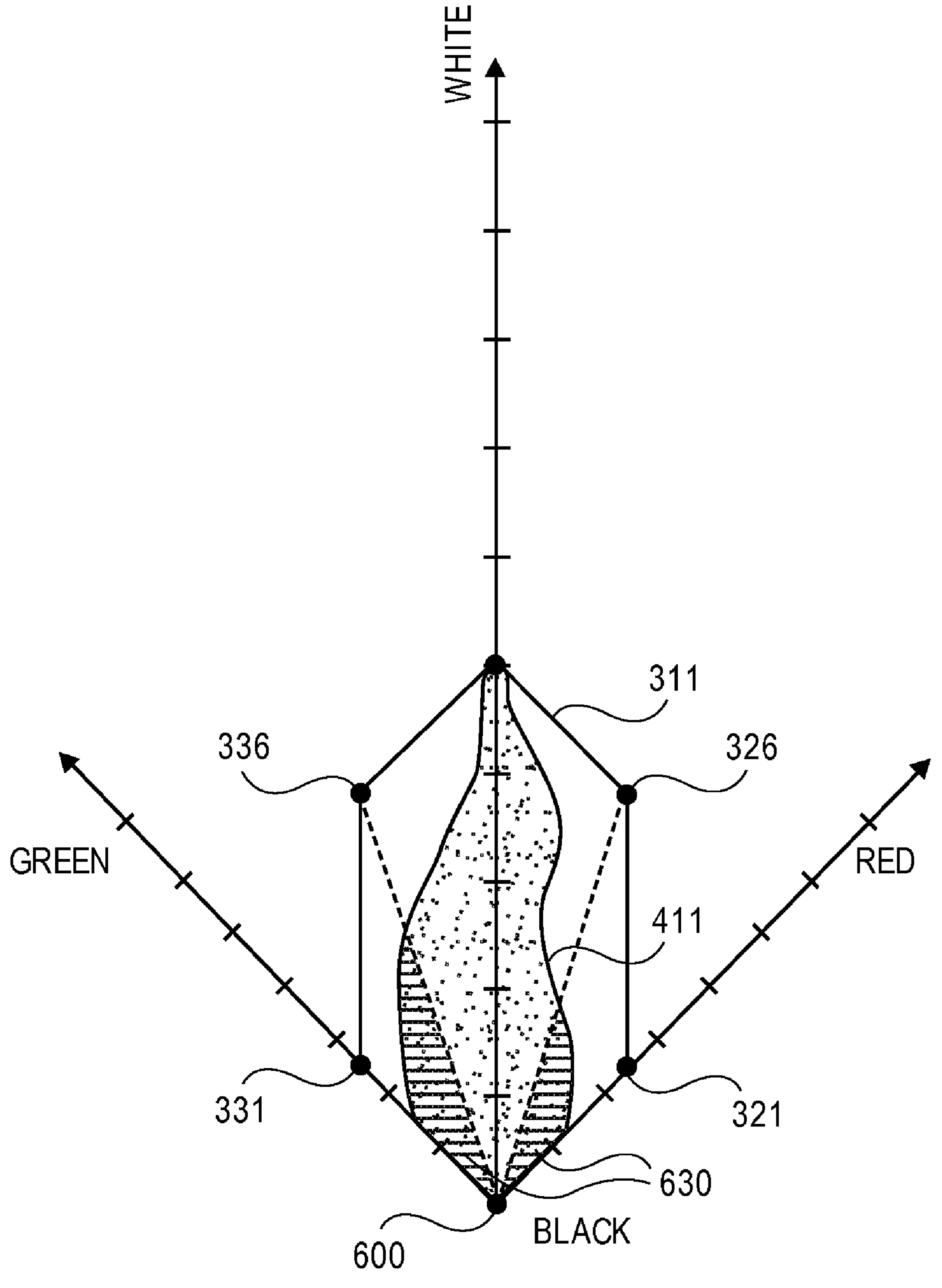
FIG. 6B shows the diagram of FIG. 1A and the half sized gamut hull of FIG. 3B overlaid onto the color brightness gamut of the representative image of FIG. 4A that has full brightness white colors but no bright saturated colors, fitting inside of the available gamut hull with the areas that may be scaled down unnecessarily to allow potential OOG color to fit into the available hull.
Figure 6C:
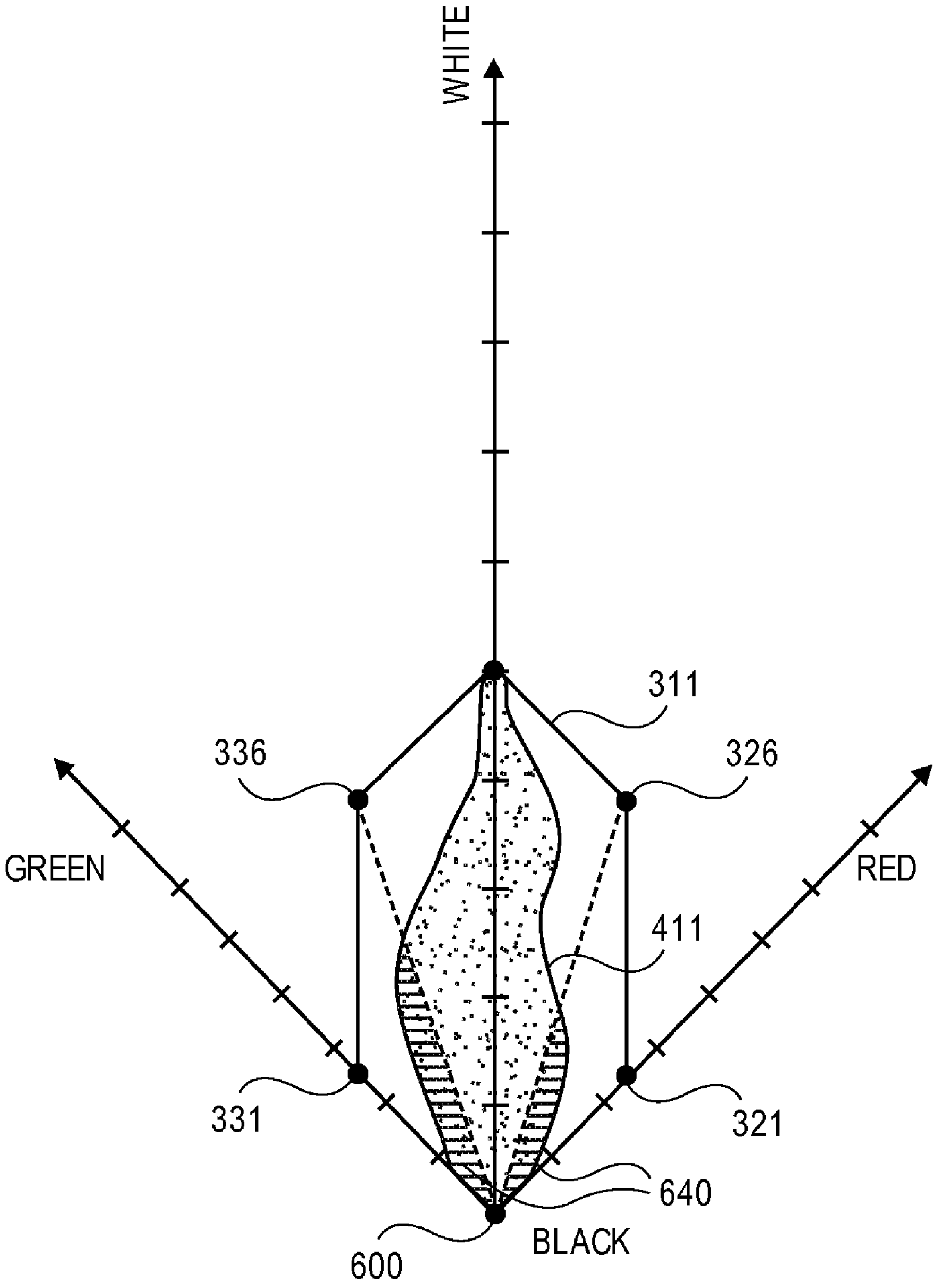
FIG. 6C shows the diagram of FIG. 1A and the half sized gamut hull of FIG. 3B overlaid onto the color brightness gamut of the representative image of FIG. 6B that has full brightness white colors but no bright saturated colors, fitting inside of the available gamut hull with the areas that have been scaled down unnecessarily to allow potential OOG color to fit into the available hull.

While this method of down-scaling the mid-to-high saturation colors brings all of the OOG colors 340 & 350 into gamut, it also tends to unnecessarily "punish", (i.e. scale down) those same mid-to-high saturation colors in images that don't have OOG colors. For example, consider the image gamut 411 in the diagram shown in FIG. 6B. It has mid-to-high saturation colors 630 that lie in the triangles formed from black 600 to the brightest high saturation 321 and 331 to the brightest mid-saturation 326 and 336 respectively. Colors inside of this triangle do not necessarily have to be scaled down to 'make room' for OOG colors when no OOG colors are present. However, in other mapping systems, these in-gamut mid-to-high saturation colors 630 are reduced in luminance as shown in FIG. 6C.

Selective Compression Based on Survey of Image Data

As not every color of a given saturation needs to be compressed, it may not be desirable to do so. For example, if an image has no colors that are OOG, the saturated colors need not be compressed to black to make "room" for non-existent brighter colors of that saturation.

In one embodiment, one improved technique might be to survey some or all of the color in an image to find the color that is the most OOG. Once found, it may be possible to calculate or otherwise find the minimum ratio of compression that would bring in some or all of the OOG colors into gamut but not push them down any further than is needed. If no colors were OOG, than no colors would be compressed to black.

In another embodiment, it is possible to refine the technique of that first embodiment on a spatial basis. For example, consider an image in which a first region of the image contained OOG colors, while a second region contained saturated colors that were not OOG. In such a case, it may not be necessary to compress (and hence, "punish") the gamut colors in that second region because of OOG colors in the first region. Thus, this present embodiment comprises a technique of segmenting an image into regions that may have different compression ratio values such that, in each given region, a minimum compression ratio value may be found and applied in such a way that the local contrast is maintained without unduly "punishing" saturated colors in other regions. Thus, in both first and second embodiments, it may be desirable to determine which colors need to be scaled down to bring them into gamut, and which surrounding colors to reduce to maintain local contrast, without unnecessarily scaling down colors that do not need to be reduced.

Figure 4B:
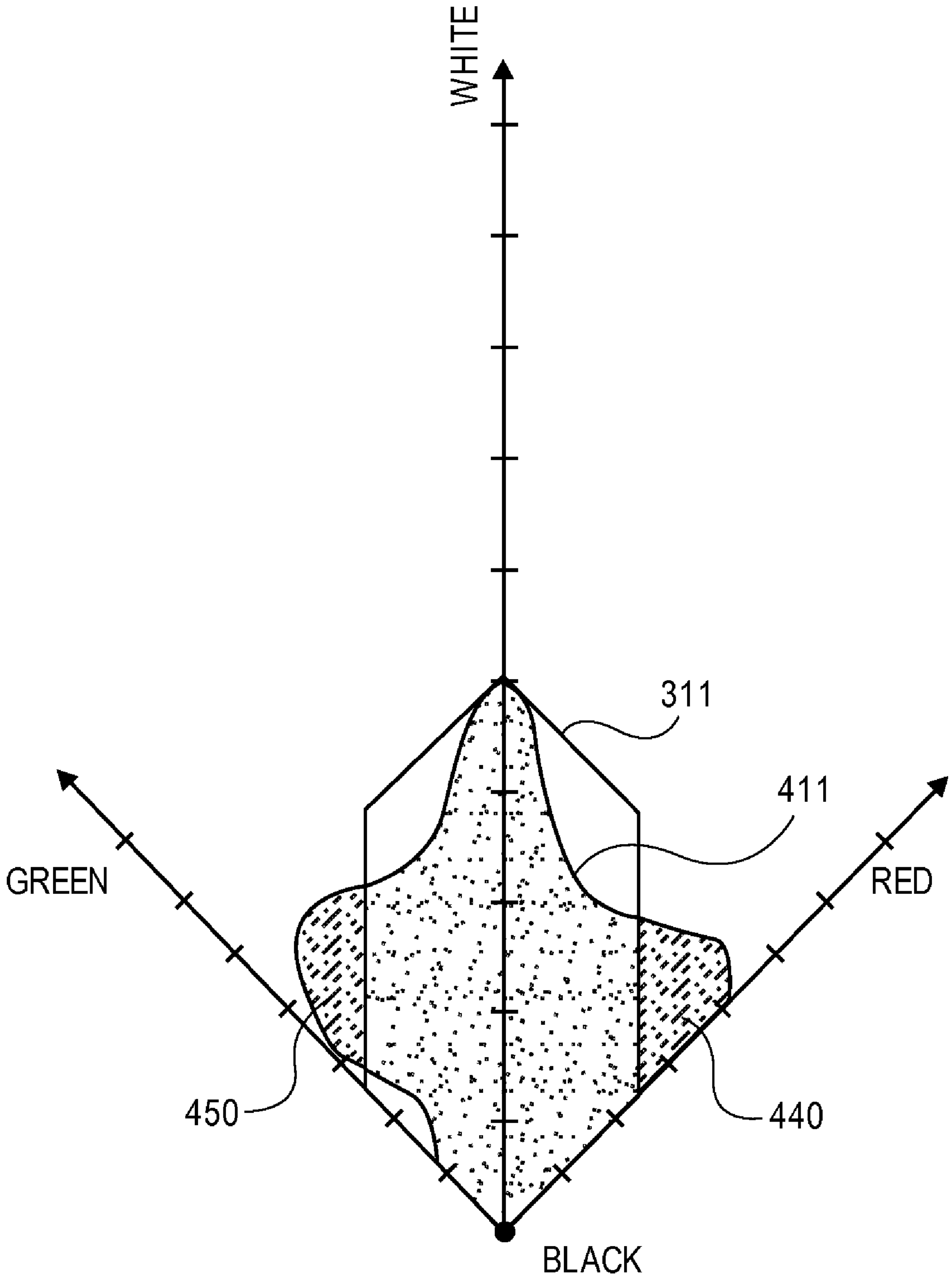
FIG. 4B shows the diagram of FIG. 1A and the half sized gamut hull of FIG. 3B overlaid onto the color brightness gamut of a representative image that has full brightness white colors but and bright saturated colors, not fitting inside of the available gamut hull.
Figure 7:
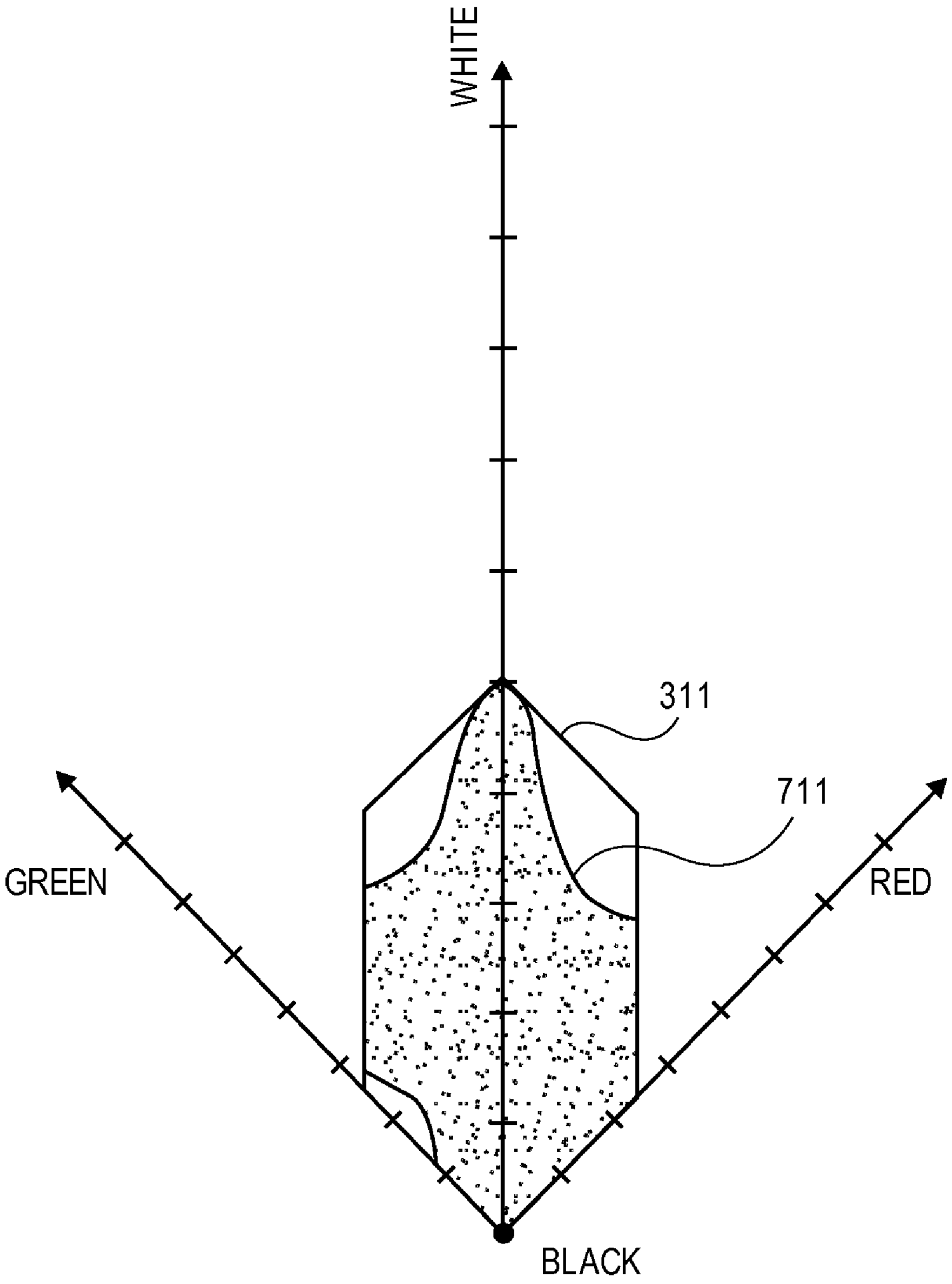
FIG. 7 shows the diagram of FIG. 1A and the half sized gamut hull of FIG. 3B overlaid onto the color brightness gamut of the representative image of FIG. 4B that has full brightness white colors but and bright saturated colors, not fitting inside of the available gamut hull which have been scaled down into the available gamut hull.
Figure 8A:
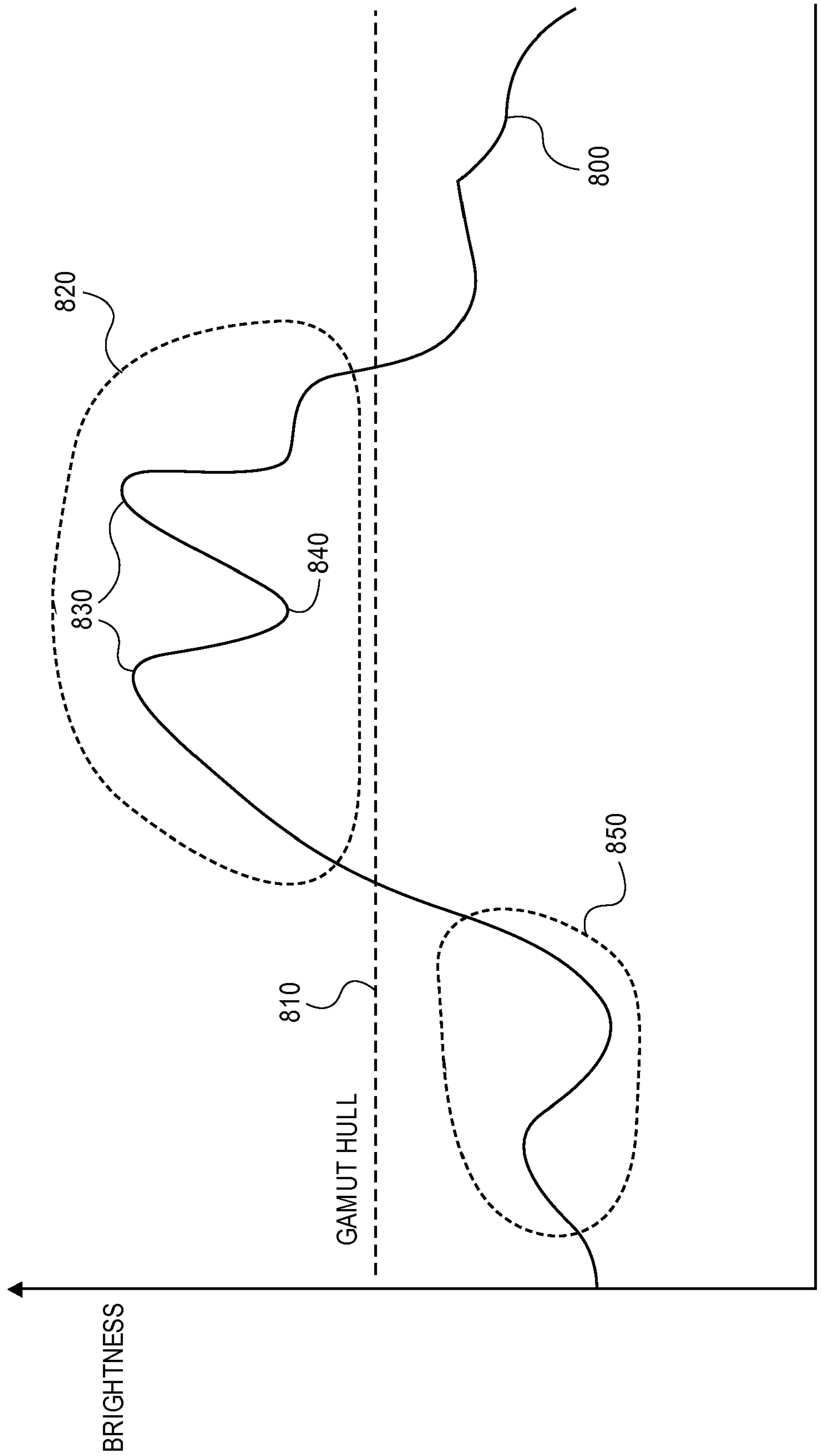
FIG. 8A shows a one dimensional slice of a two dimensional image signal that exceeds a given display's gamut hull.
Figure 8B:
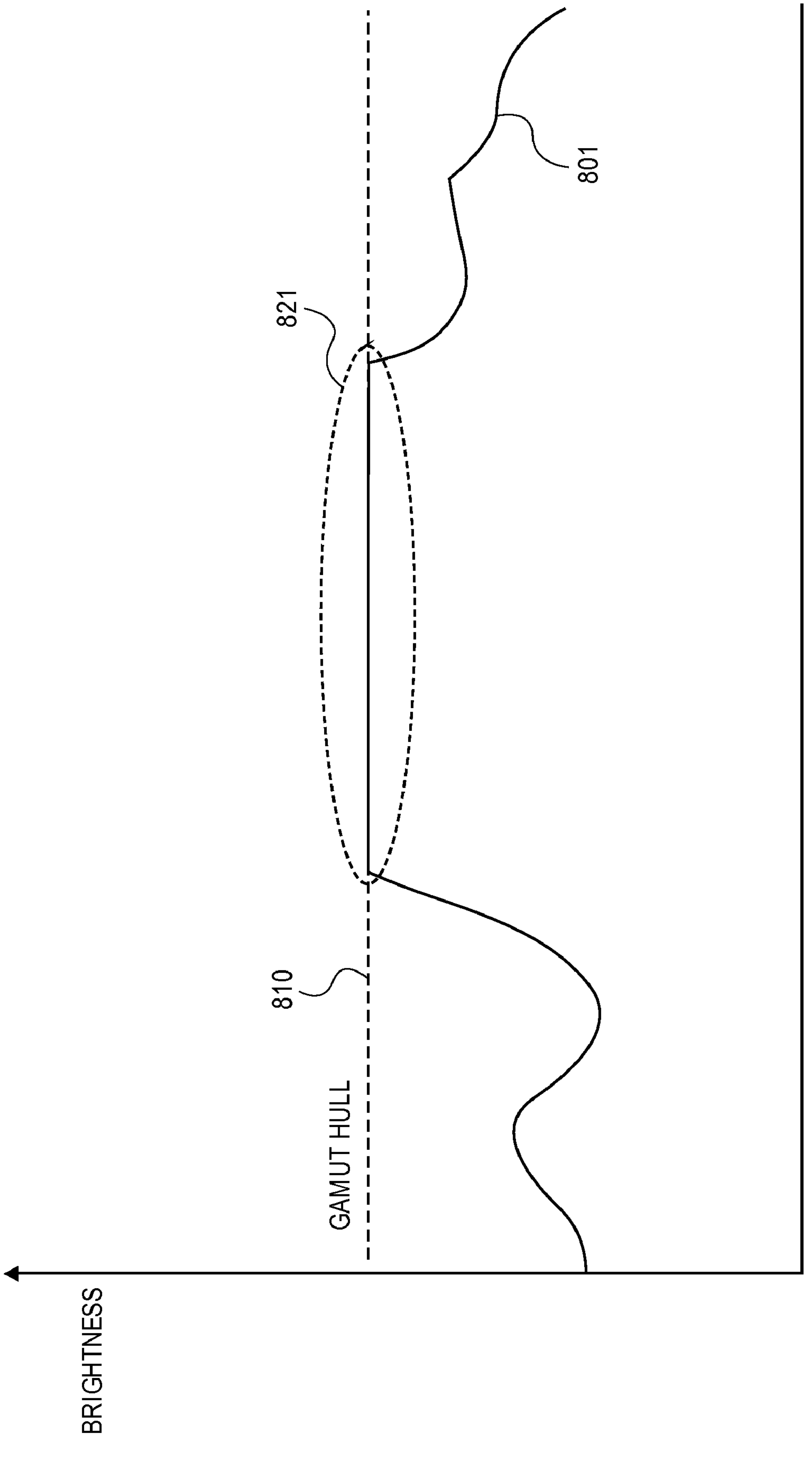
FIG. 8B shows the one dimensional slice of the two dimensional image signal of FIG. 8A that has been clamped to the gamut hull.

In several of the embodiments described herein, FIG. 7 depicts one possible desirable result of the techniques recited herein. FIG. 7 shows end result of gamut mapping OOG colors as depicted in FIG. 4B, wherein the OOG colors in regions 440 and 450 are brought back into the available hull, resulting in gamut 711. There are several ways to accomplish the processing depicted in FIG. 7. One such possible method is to clamp all OOG colors to the hull as shown in FIG. 8B. However, for reasons explained below, this method does not yield the most desirable result. So, while FIG. 7 broadly shows the end result, some techniques are clearly more desirable than others.

Figure 5B:
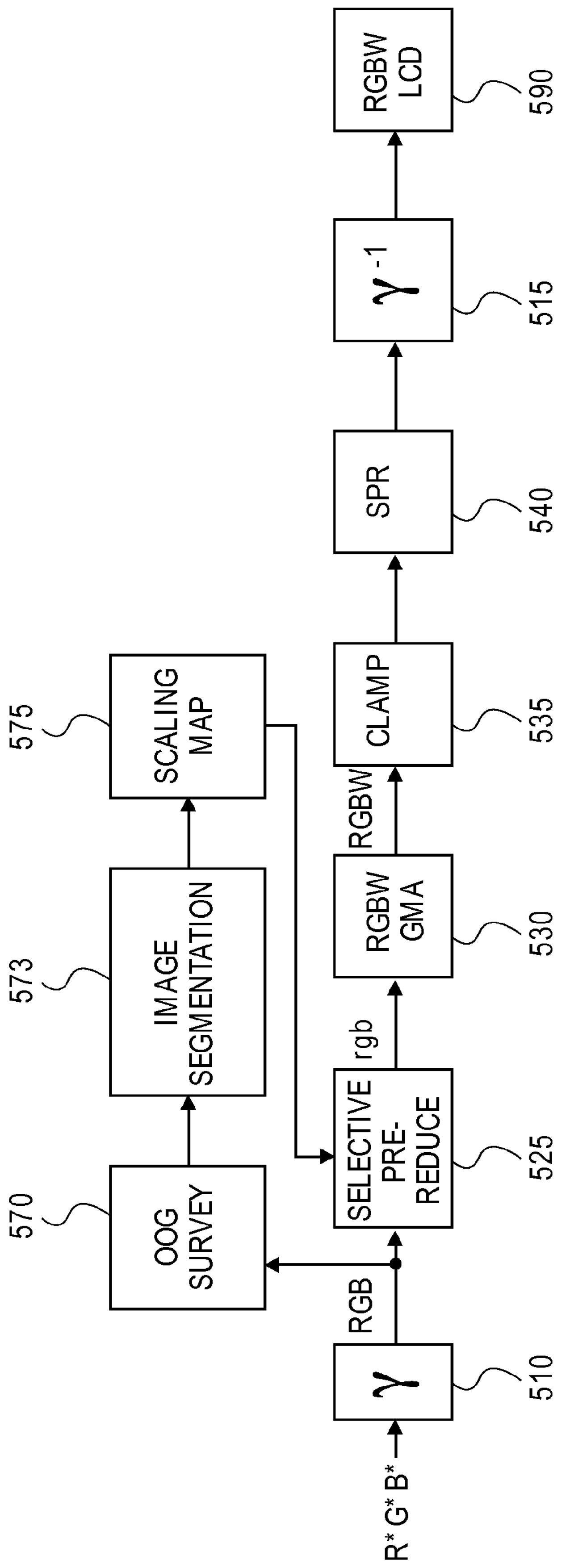
FIG. 5B shows one embodiment of a multiprimary display system system comprising a selective compression module.

FIG. 5B shows one possible embodiment of a RGBW (or alternatively a multiprimary) display system that may incorporate one or more of the techniques disclosed herein. As with the system in FIG. 5, the system of FIG. 5B may comprise an optional clamp 535 and optional SPR 540 block—as well as gamma 510 and inverse gamma 590 block.

The system of FIG. 5B also may comprise an OOG survey block 570, image segmentation block 573, scaling map 575 and a selective pre-reduce block 525. These blocks may comprise an entire selective compression (or reduction) unit. In operation, the system could survey input image data with OOG survey block 570 to determine colors that are out of gamut and to ascertain whether such OOG colors exist in any of the image segments or partitions that are mentioned herein in image segmentation block 573. As mentioned herein, an image could be segmented according to spatial consideration, chromatic considerations or temporal considerations—or any desirable combination therein.

Once the OOG colors in their particular segment are determined, scaling map 575 determines the amount of selective compression to apply to any given image data. Selective pre-reduce block 525 would then apply such selective compression or reduction to the input data to produce the appropriate intermediate image data that is selectively compressed or reduced.

Although the system of FIG. 5B (or 5A, 5C, or 5D, for that matter) contemplates an LCD system particularly, it will be appreciated that these techniques disclosed herein would also suffice for any type of display system—including OLED, plasma or the like. In addition, these techniques apply to systems other than an RGB to RGBW (or other multiprimary system). In particular, these techniques would also suffice for any system in which a mapping needs to take place from a first color gamut hull to a second, differently shaped, gamut hull.

Figure 5C:
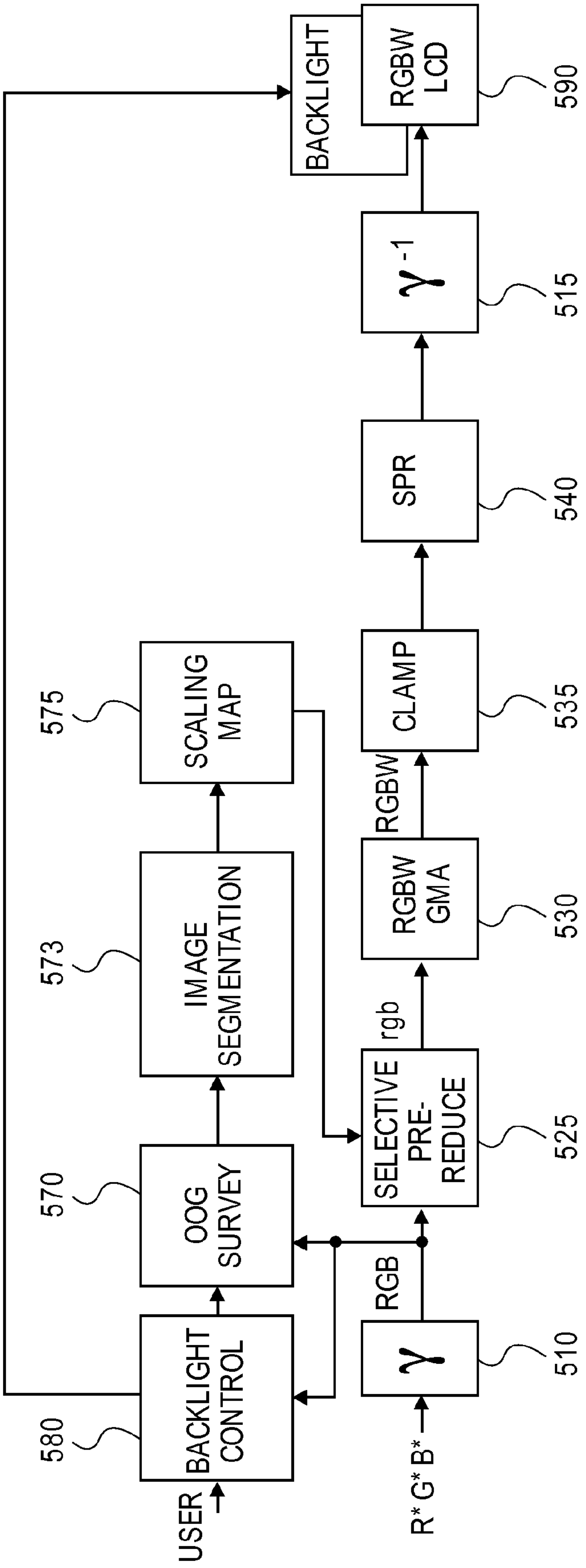
FIG. 5C shows another embodiment of a multiprimary display system system comprising a selective compression module comprising a backlight that may be modulated by a backlight control unit.

The system of FIG. 5B may comprise a unitary backlight (not shown) that may or may not be modulated. In the case of a steady backlight, the selective compression is applied to the image data values themselves. However, the techniques disclosed herein may be applied to systems in which the backlight may be modulated according to some backlight control. The system of FIG. 5C is merely one such embodiment. Backlight control 580 may modulate the intensity of the backlight and thus, the selective compression or reduction could be a function of image data compression and backlight modulation.

Figure 5D:
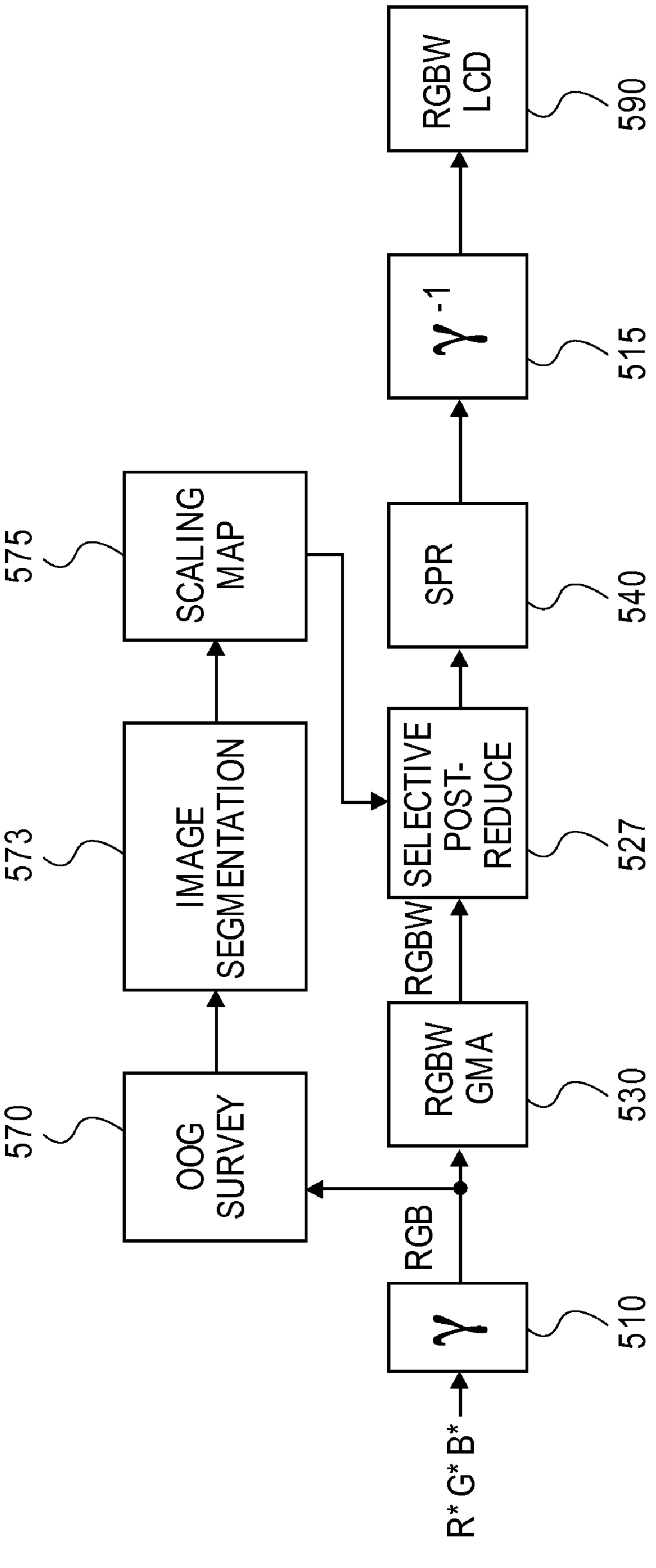
FIG. 5D shows yet another embodiment of a multiprimary display system system comprising a selective compression module that is incorporated in a post-GMA processing unit.

Yet another embodiment of a display system comprising one or more of the techniques disclosed herein is shown in FIG. 5D. In the system of FIG. 5D, the application of the selective compression or reduction could be placed as a post-GMA reduction unit. It will be appreciated that the techniques disclosed herein may be implemented in any suitable block within a display system without departing from the scope of these techniques. As yet another embodiment, the display system may provide the selective compression unit entirely after the GMA block. In such a case, OOG survey, image segmentation, scaling map and selective reduction may be conducted after the mapping of one gamut to another gamut.

Figure 8C:
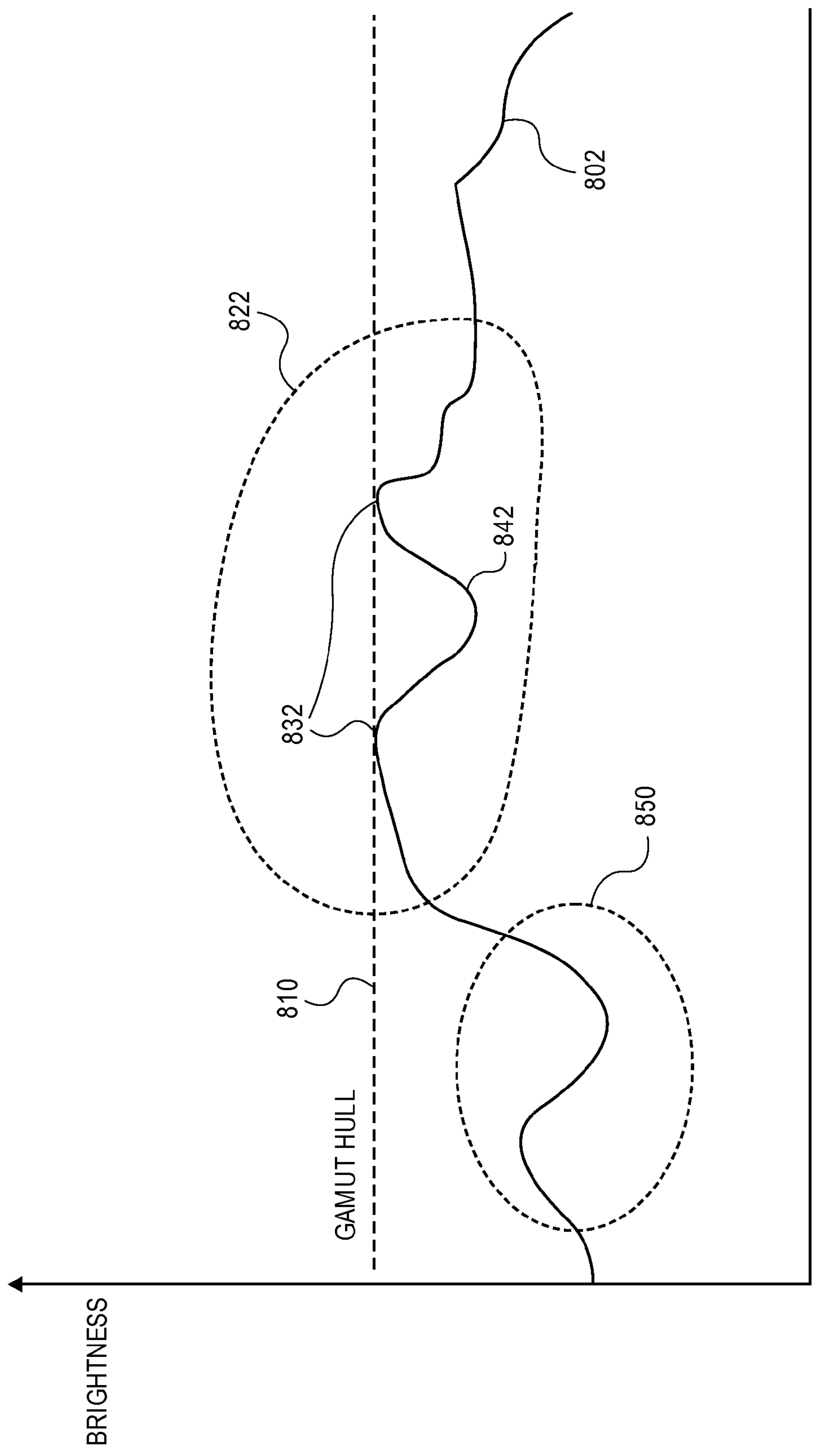
FIG. 8C shows the on dimensional slice of a two dimensional image signal of FIG. 8A that has been locally compressed, scaled down, to fit with the gamut hull while maintaining local contrast.

To expand on these points, it may be instructive to compare how an original image (as depicted for example in FIG. 8A) may look as a clamped image 801 (as shown in FIG. 8B)—as compared a locally compressed image 802 as shown in FIG. 8C (as might be performed in accordance with several embodiments contained herein). FIG. 8A is an exemplary graph of a one dimensional slice 800 of a two-dimensional image representing the brightness of that said image at each point along the original image slice 800. The original image includes a region 820 which would extend beyond the gamut hull 810.

The graph 800 includes features having a local contrast—e.g. peaks 830 and a valley 840 between them. This OOG region 820 cannot be reproduced on the display and must be brought back into the gamut hull. In FIG. 8B, a clamped image 801 includes a region 821 which has been clamped to the gamut hull. It should be noted that in clamping to the gamut hull, local contrast information, the varying brightness with peaks 830 and valley 840, from the original image 800 OOG region 820 has been lost in the clamped image 801 in the region 821 which was clamped to the gamut hull.

Turning attention to FIG. 8B, it will be noted that the locally compressed region 822 of the compressed image 802 shown in FIG. 8C substantially maintains the local contrast features. The local OOG brightness peaks 832 have been compressed to the gamut hull, while the valley 842 has been compressed by a similar ratio as the nearby peaks 832 in order to maintain local contrast. However, a region 850 of in-gamut colors some distance from the OOG region 820 in the original image 800 from FIG. 8A need not be compressed as shown in FIG. 8C in which this same region 850 is faithfully reproduced without compression. It should also be noted also that the locally compressed region 822 may extend, if desired, beyond the original OOG region 820 in order to gently compress colors that were originally in gamut such that local contrast is maintained with originally in gamut colors. Of course, the amount of any extended region of compression (if any) forms alternative embodiments of the present techniques.

In yet another embodiment, in order to compress OOG image regions while maintain local contrast and at the same time reduce the likelihood of "punishing" in gamut colors, it may useful to segment the image into regions with different properties so that they may be compressed by different scaling factors.

One such embodiment of image segmentation might be to partition according to chromatic data—for one example, to cut up chromatic space as represented by a color hue circle or a color triangle (or any other suitable area) into sections or sectors. For example, consider the color hue circle 900 in FIG. 9A and the color triangle 901 in FIG. 9B. The color space may be divided into sections, such as shown as sectors 910 or sectors 911. In some embodiments, different color hue section 910 or sectors 911 may have a different compression ratio. In addition in these and other embodiments, the compression ratios may also be feathered,—e.g. smoothed across adjacent color hues around the color circle 900 or color triangle 901 to reduce potential artifacts as objects shade from one hue section to another.

In some embodiments, an image may be surveyed to determine the brightest, most OOG pixel value in each defined hue segment. This highest value may then be used to determine the compression, the down scaling ratio, to apply to all colors in that hue sector. This method takes advantage of the likelihood that colors of a given hue belong to a single object, or a group of objects, with similar amounts of peak OOG values. For example, a single bright saturated red rose on saturated but dark green background of leaves would be likely to have similar OOG peaks in the red hue, while the green peaks would be in gamut.

Another embodiment of image segmentation may be spatial. The image may be cut up into regions or blocks of any convenient or suitable shape. For example, consider the image 1000 in FIG. 10, divided into square regions, blocks 1010, the simplest regional shape into which to segment the image are squares which evenly tile the image. Each block 1010 may be surveyed to find the minimum compression ratio value required to assure that any and all OOG colors are brought back into gamut. The value of this compression ratio may also be feathered, smoothed, across adjacent blocks 1010 to reduce the potential for visible artifacts. The shape of the region may alternatively be any convenient polygon, such as rectangles, triangles, hexagons, etc.

It is also possible to combine spatial and chromatic based image segmentation together. For example, the image may be both cut up into polygonal blocks 1010 and hue sectors 911 or sections 910. This creates a three dimensional spatio-chromatic space to segment the image. Each color hue has its own two dimensional polygonal block segmentation of the image. Thus, compressing an OOG red in one block won't "punish" in gamut reds several blocks over. Likewise, a bright saturated yellow that is OOG won't punish an in-gamut saturated blue next to it in the same block 1010.

For the finest partitioning of the image space, yet another spatial embodiment may be to treat each pixel independently and find the minimum compression ratio to bring that pixel into gamut if it is OOG. The value of the compression ratio may be feathered, smoothed, in the neighborhood of each pixel to maintain the local contrast while reducing the potential artifacts.

Yet another method may be to combine spatial and luminance. For example, each pixel may be treated independently for setting the compression ratio, with a feathering function that is both a function of spatial distance and luminance difference such that dark saturated colors near an OOG color are less punished than a brighter but still in gamut color at the same spatial distance. This maintains local contrast without overly punishing already high contrast portions of the image.

For video, the compression ratio values may be smoothed in time using a decay function of a few frames—but in a manner that may not introduce temporal effects. For example, if a large OOG yellow object suddenly moves onto the screen, it may cause nearby pixels to be compressed suddenly and this may be visible. This effect may be smoothed by using a decay function of a few frames.

In one embodiment of this technique, it may be desirable to calculate the color compression ratio values, as described herein or otherwise, for each video frame. If the compression ratio values for one frame are very different from the previous frame, the values are only allowed to change slowly to the new values over several frames. One embodiment of this gradual change might be to change each color compression ratio value half way from the previous value to the new value. This simple calculation implements a logarithmic decay that asymptotically approaches the new values until the difference is small enough to be clamped to the new value with no visible effect. Any other decay function, such as a linear interpolation from the previous value to the new one, may also be effective.

Figure 10:
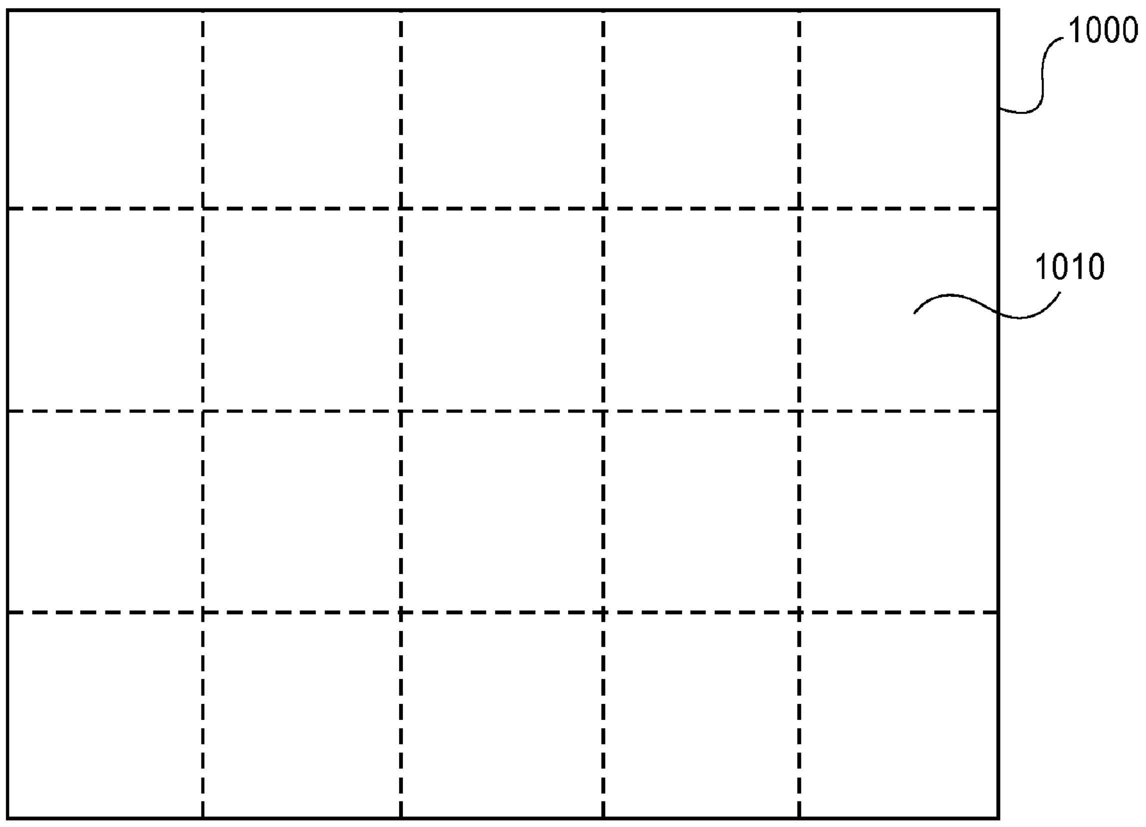
FIG. 10 is a diagram of an image divided up into square regions
Figure 11B:
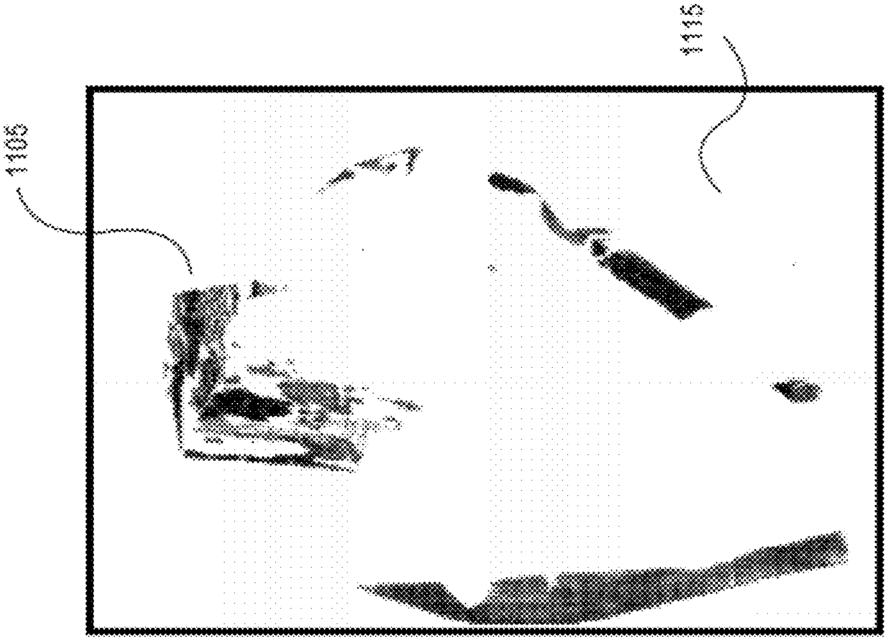
FIG. 11B shows a diagram of where FIG. 11A has out-of-gamut colors
Figure 11A:
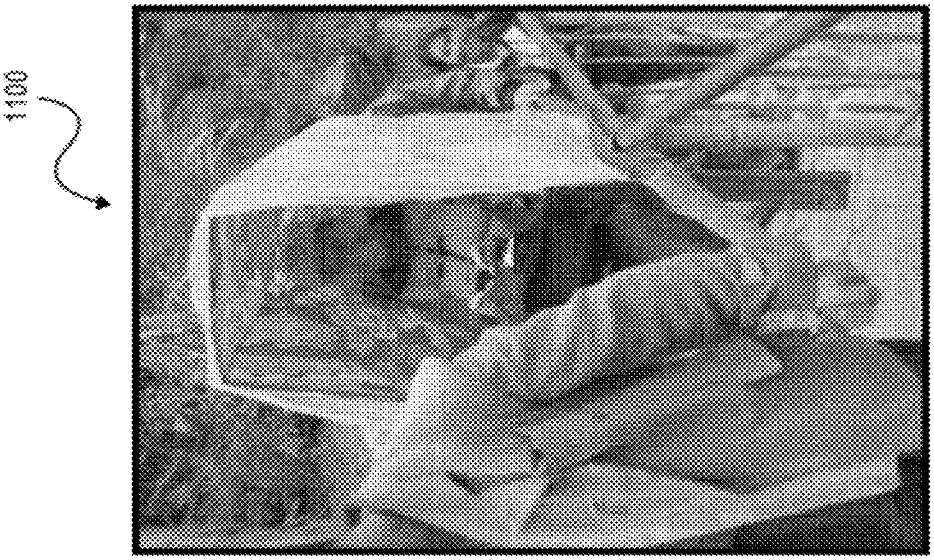
FIG. 11A shows a sample image that has out-of-gamut areas in the original color data

FIG. 11A shows a representation of a sample image 1100 to demonstrate some of the embodiments of the present invention. FIG. 11B is a map showing the areas 1105 of the image 1100 in FIG. 11A that were out-of-gamut (OOG) in the original color image 1100. Areas 1115 that are white in FIG. 11B are in-gamut, while areas 1105 that are dark in the map are OOG and the darker, the farther OOG. In one embodiment, the source image 1000 is divided into rectangular regions 1010 as shown in FIG. 10, each region surveyed to find the maximum OOG color in that region, the survey results are then used to calculate minimum color compression that would bring all the OOG colors in each region 1010 separately back into gamut.

Figure 12A:
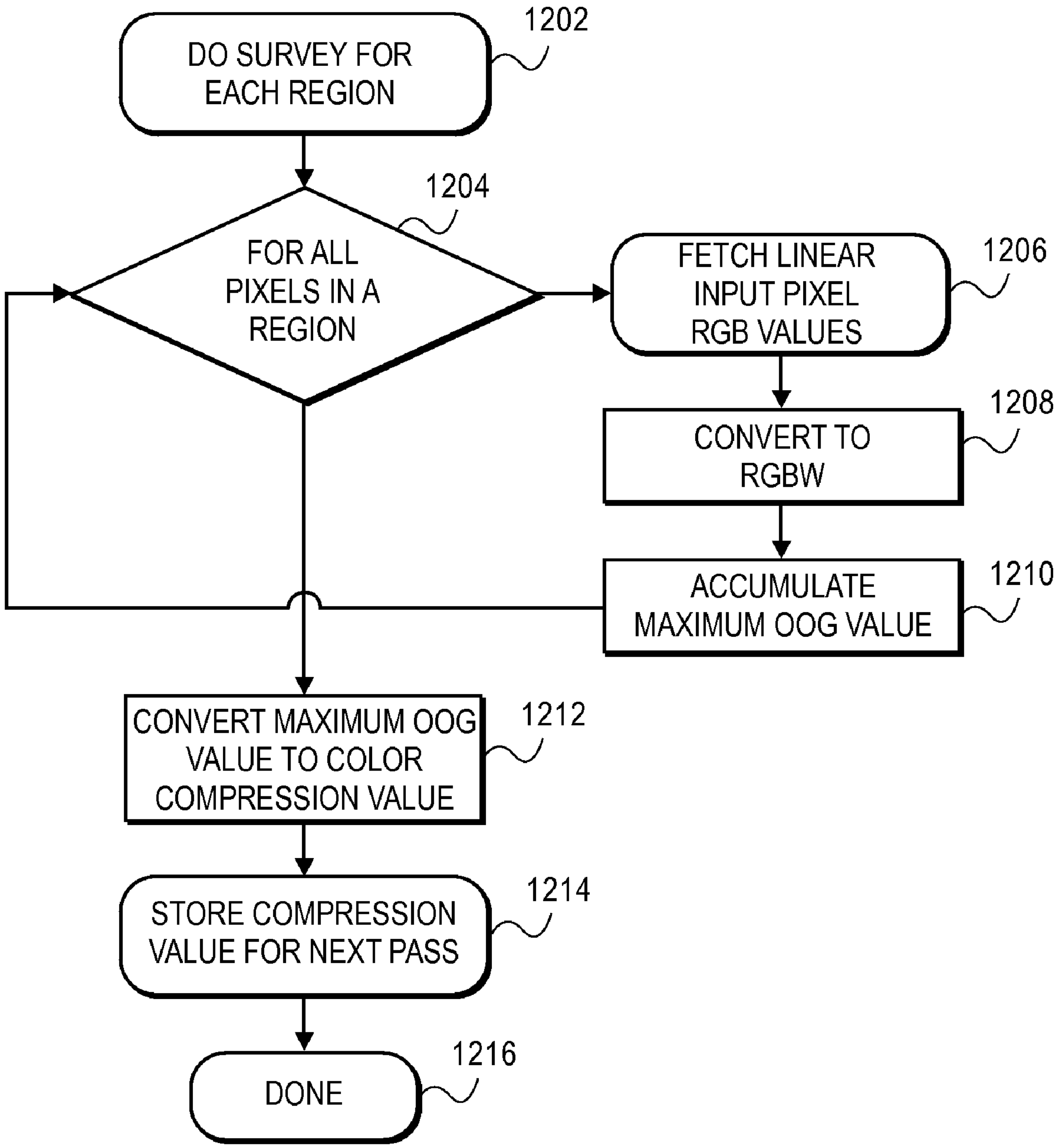
FIG. 12A is a flowchart for one embodiment of surveying regions of an image

FIG. 12A shows one possible embodiment flowchart of a survey algorithm. At step 1202, a survey of image data is performed for each region within an image. A loop is set up at 1204 to perform 1206 through 1210. Once a region is surveyed and the maximum OOG value is obtained for that region, a color compression value may be obtained as in 1212 and such value could be stored at 1214. In a second pass over the image (described below with FIG. 12B) these stored compression values are feathered and used to do the final compression of each pixel in the image.

Another embodiment of this processing might be performed via the pseudo code below:

the previously highest value. After a given region 1010 is surveyed; if peakval is above MAXCOL (which is a measure of maximum color allowed) then it is OOG. The peak value is converted into a "gmin" value which in this embodiment has a value of 256 for in-gamut colors and a number between 255 and 128 for OOG values. This gmin value is saved in a small "peak" buffer for later steps described below. One gmin value results for each region 1010 of the image 1000.

In one embodiment, the entire input image 1000 may be surveyed and the peak OOG results may be saved in a small buffer. Then the image 1000 may be processed again in a separate pass to use the results. In a hardware implementation, there may be different optimizations. For example, line buffers would allow calculating the first few rows of peak OOG results so that input values can be processed several lines later. This would use less memory than storing the whole input buffer and would allow continuous processing. Alternately, the survey could be performed on the current input image, then used on the following image. This requires no frame buffer, although the peak OOG values may be slightly out-of-date on rapidly changing images. In the software implementation shown in the pseudo-code and flowcharts here, multiple frame buffers may be optionally assumed for simplicity of description.

Listing 1

```
function dossurvey(x,y)          -- scan one region and accumulate statistics
  local peakval=0                --peakval for this region
  local gmin                     --gmin value for this region
  local i,j                      --loop variables
  for j=0,region_size-1 do       --loop for all the pixels inside a region
    for i=0,region_size-1 do
      local r,g,b=spr.fetch("ingam",x*region_size+i,y*region_size+j)--fetch the linear data
      maxp = minRGBW(r,g,b)              --minimal RGBW GMA just to calculate OOG
      peakval = math.max(peakval,maxp)   --just record the highest value found
    end
  end
  if peakval<=MAXCOL then          --no colors OOG
    gmin = 256                     --then don't compress at all!
  else
    gmin = 256-math.floor(256*peakval/(MAXCOL*2+1)+0.5)+128
  end
  spr.store("peak",x,y,gmin)
end
```

The above pseudo-code embodiment would survey pixels in square regions 1010 of the input image 1000 (or any other tessellating areas such as triangles and hexagons). The size of the square regions here is the variable region_size. This embodiment may be used for a display that converts input RGB values (after linearizing input gamma conversion) to a multiprimary RGBW system. Other multiprimary systems or any display that performs color boosting, equalization, dynamic backlight control, or filtering of images may also produce OOG colors. The methods of this invention may also be used to improve the output of these systems.

Figure 12B:
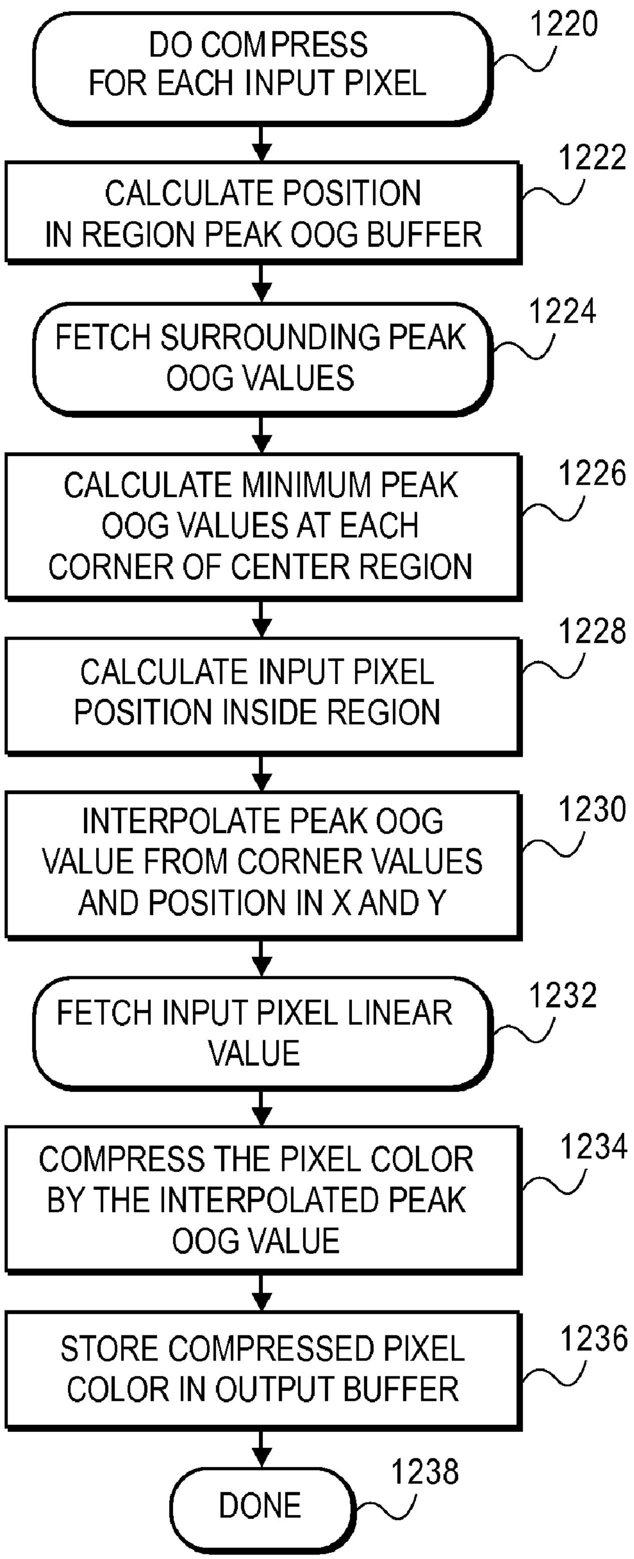
FIG. 12B is a flowchart for feathering the results from FIG. 12A and compressing colors.

The peak value for a given region 1010 is surveyed, accumulated in peakval, by comparing each value with the previously highest value, saving the new value if it is higher than FIG. 12B depicts a flowchart for the use of the peak OOG result thereby obtained. Step 1220 starts the process called "Do Compress" for image data values. Steps 1222 through 1236 envision the processing or compressing of a given image data value that is based upon the position of that data value within the image itself and considers all of the peak OOG values within the neighborhood or surrounding region of the data value. The compression of the data value could be based upon a function of the surrounding OOG values as well as other factors, such as distance of data value from OOG value. Any suitable function may suffice, including an interpolation.

The following is a possible alternative pseudo-code embodiment that uses the peak OOG results from the region survey:

Listing 2

```
function docompress(x,y) --do color compression
  local xp,yp = math.floor(x/region_size),math.floor(y/region_size)
```

-continued

Listing 2

```
  local m00 = spr.fetch("peak",xp−1,yp−1)    --read in the surrounding 9 peak OOG values
  local m10 = spr.fetch("peak",xp−1,yp−0)
  local m20 = spr.fetch("peak",xp−1,yp+1)
  local m01 = spr.fetch("peak",xp−0,yp−1)
  local m11 = spr.fetch("peak",xp−0,yp−0)
  local m21 = spr.fetch("peak",xp−0,yp+1)
  local m02 = spr.fetch("peak",xp+1,yp−1)
  local m12 = spr.fetch("peak",xp+1,yp−0)
  local m22 = spr.fetch("peak",xp+1,yp+1)
  --calculate the values at the corners of the center region
  local ul = math.min(m00,m01,m10,m11)
  local ur = math.min(m01,m02,m11,m12)
  local ll = math.min(m10,m11,m20,m21)
  local lr = math.min(m11,m12,m21,m22)
  --calculate position inside the region
  local xr,yr=math.mod(x,region_size),math.mod(y,region_size)
  local u = (ul*(region_size−xr)+ur*xr)/region_size --interpolate in x
  local l = (ll*(region_size−xr)+lr*xr)/region_size
  REG_GMIN = math.floor((u*(region_size−yr)+l*yr)/region_size)      --interpolate in y
  local r,g,b = spr.fetch("ingam",x,y) --get linear input values
  local R,G,B = prescale(r,g,b,REG_GMIN)     --perform color compression
  spr.store("comp",x,y,R,G,B)               --save in output buffer
end
```

In this embodiment, the peak OOG values may be interpolated or otherwise feathered, between regions 1010 to prevent discontinuities in the final image. The decompress function may be called for each input pixel. It calculates the position in the peak OOG survey buffer for the region that the present pixel lies in—e.g. the entire image or some subset of the image. The peak OOG results from that region and the surrounding regions (in this case, there are eight—but any other number is possible) are fetched and used to calculate the minimum peak OOG value at each corner of the center region. The position of the input pixel in the region is then used to interpolate between the corner peak OOG values and calculate a final REG_GMIN value. This value may be sent to a prescale function to perform the color compression.

In one embodiment of this invention, the REG_GMIN values may be designed to have values between 256 and 128, so the prescale function may simply multiply the three color primaries by REG_GMIN and then divide by 256 (accomplished in hardware with a right shift of 8 bits). This will have the result of multiplying (scaling, compressing) the color by 1.0 when REG_GMIN is 256, by 0.5 when REG_GMIN is 128, and by different fixed point binary fractions for all values between. Multiplying by 1.0 has no effect on the colors, while multiplying by 0.5 compresses the colors half way back to black. In this embodiment colors may be OOG by as much as 2 times, and multiplying by 0.5 brings them exactly back into gamut.

If the region_size is as large as the entire input image 1000, this algorithm will calculate a single peak OOG value and scale all input pixels by the same amount to bring the most OOG pixel in the entire image back into gamut. This may punish many pixels in the image that are not OOG by scaling them down. It may be desirable that, when region_size is smaller, each region 1010 of the image 1000 will have a different peak OOG value and many pixels may not be compressed at all. For example, if region_size is 16 and the image 1100 in FIG. 11A is 240×320 pixels, then the map 1120 of FIG. 11C shows which areas 1127 of the image 1000 will be compressed the most. The areas 1125 of the map in FIG. 11C that are white shows where pixels in the original color image will not be color compressed at all. The dark areas 1127 are where more color compression takes place. This map looks like a very broadly filtered version of the map of OOG pixels in FIG. 11B and suggests that smaller values of region size would "punish" fewer pixels. However, the algorithms above use the same region_size for both the size of the regions and the extent of the feathering. A different embodiment may separate these two effects. When taken to the limit, a separate peak OOG value may be calculated for each pixel in the input image, and the results feathered to any distance before using them to color compress the input image.

Figure 12C:
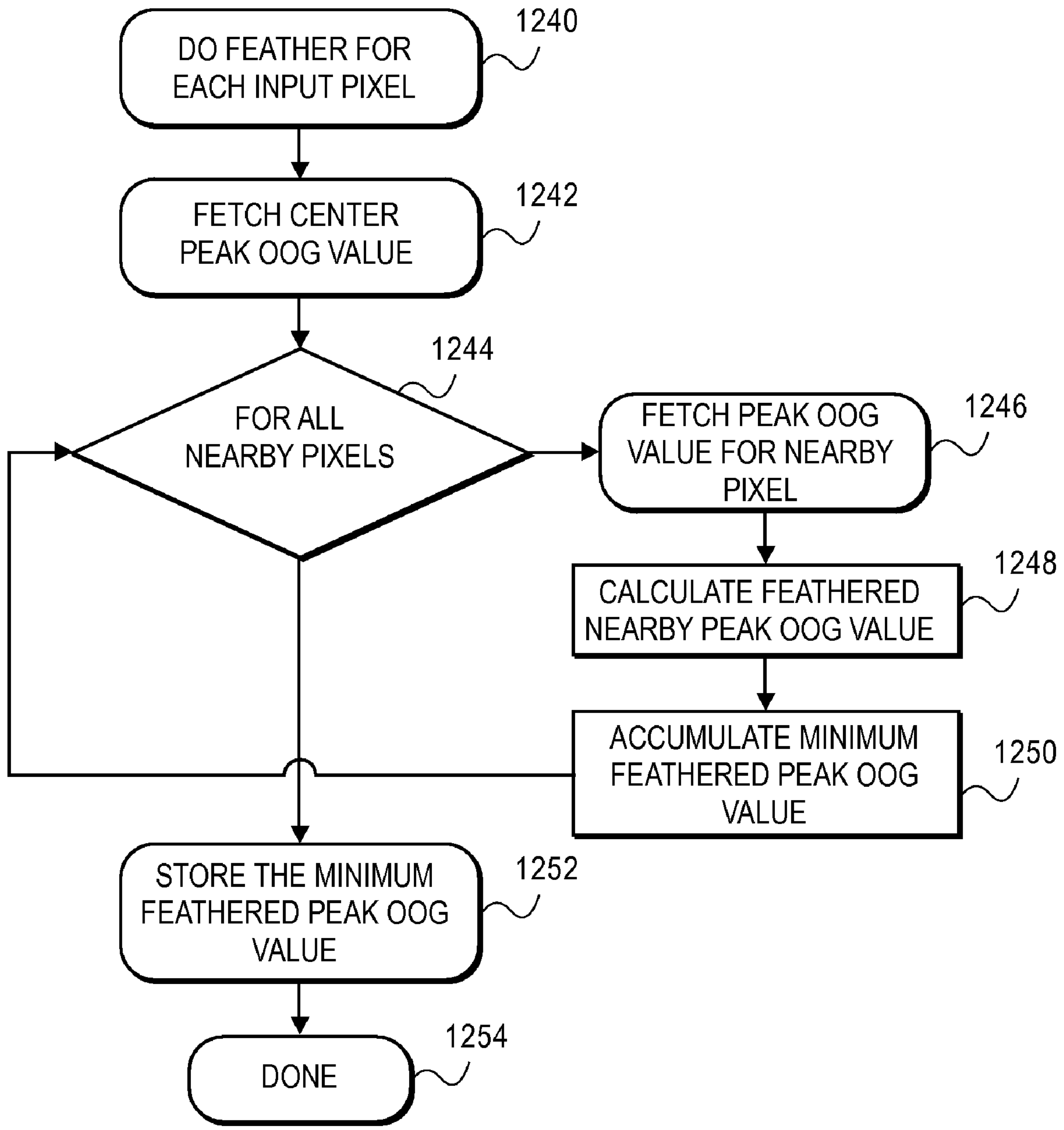
FIG. 12C is a flowchart showing feathering of the edges of regions independent from the region sizes

FIG. 12C is one flowchart embodiment of this interpolation or a possible feathering algorithm. Step 1240 starts the processing for each (or at least substantially all) input pixels. Step 1242 fetches the peak OOG value in a region occupied by the input pixel. For all (or some subset thereof in other embodiments) nearby pixels, steps 1244 through 1250 set up a process in which peak OOG values of nearby pixels are fetched and feathered (or otherwise processed) OOG values are obtained and the accumulated minimum such feathered or processed OOG value is found and ultimately stored (as 1252).

The following pseudo-code of listing 3 gives another embodiment below:

Listing 3

```
function dofeather(x,y)
  local i,j              --loop counters
  local gmin=spr.fetch("peak",x,y)            --center value
  for j=−cos_width,cos_width do               --loop for all surrounding pixels
    for i=−cos_width,cos_width do
      local near=spr.fetch("peak",x+i,y+j)    --fetch the value of nearby GMIN values
```

-continued

Listing 3

```
    near = near +                        --feather using a cosine function
      (256-near) *
      (1-(math.cos(i*math.pi/cos_width)+1) *
        (math.cos(j*math.pi/cos_width)+1) / 4)
    gmin = math.min(gmin,near)           --use the minimum of the surrounding values
   end
  end
 spr.store("gmin",x,y,gmin)
end
```

This algorithm may operate with an assumption that the dosurvey function of Listing 1 has been run with region_size set to 1 so that a separate peak OOG value has been calculated for every input pixel. Then the dofeather function may be called for every input pixel to feather the peak OOG values. The peak OOG value may not be larger than the value calculated for the input pixel itself, so that is fetched from the peak_OOG buffer first. Then the feathered values of all the surrounding pixel peak OOG values may be calculated. The variable cos_width determines the width of the feathering function. All the peak OOG values within this range may be fetched and feathered with a cosine function in this embodiment, although other feathering functions may be useful, such as tent filters, clamped Gaussian or sync functions, etc.

Although not necessary, this embodiment uses a separate cosine on each axis. This allows the algorithm to be separated in X and Y and implemented less expensively in hardware with line buffers and a small table of cosine values. The resulting cosine function falls off according to the "Manhattan Distance" from each peak OOG value in this case. Using the Pythagorean distance may also work but would require more gates to implement in hardware. The minimum of all the surrounding feathered peak OOG values is accumulated and saved in a separate "gmin" buffer. Note that the minimum may be desirable because the smaller the gmin value, the more a pixel may be compressed colors towards black, so the smallest value may be the "strongest". The result is a gmin buffer with a separate feathered value for each input pixel. The docompress function in this case does not have to do the filtering as in listing 2 above, since that step may be accomplished in listing 3 already. Instead, it may suffice that the docompress function fetch the final feathered gmin value and use it to compress the color of the associated input pixel.

Figure 11D:
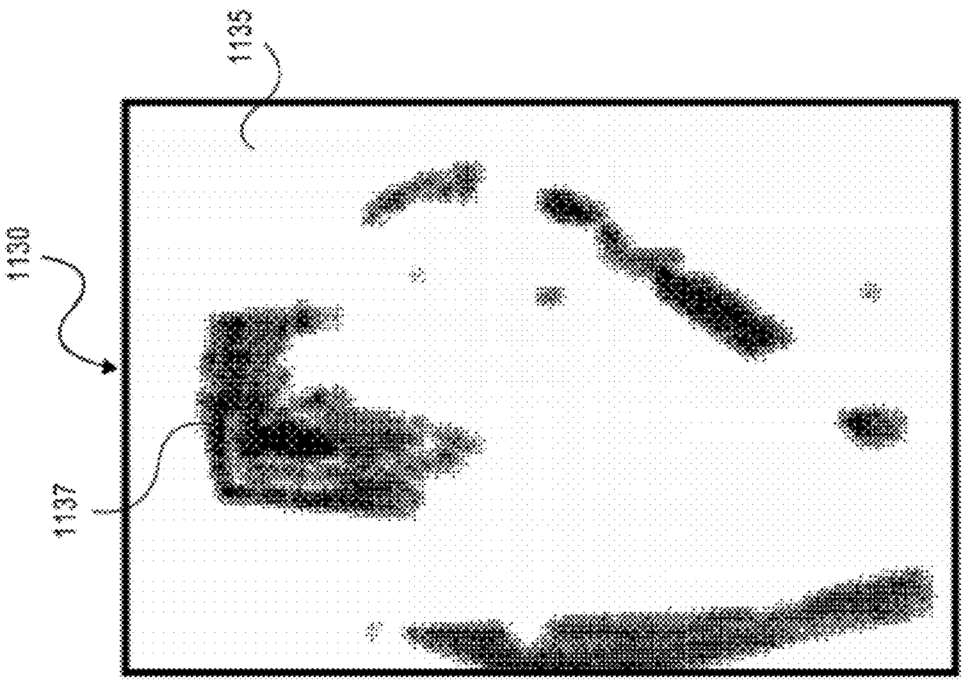
FIG. 11D shows where and how much FIG. 11A would be compressed by the separate pixel embodiment of the present invention.
Figure 11C:
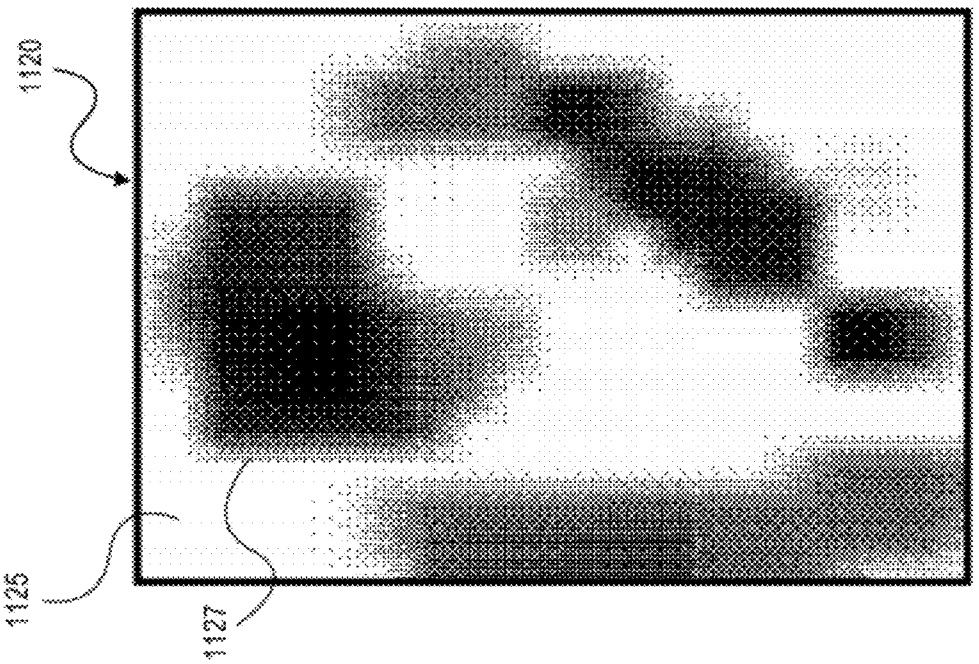
FIG. 11C shows where and how much FIG. 11A would be compressed by the rectangular region embodiment of the present invention.

Returning to the example herein, when this algorithm is performed on the image 1100 from FIG. 11A with a cos_width of 5 then the map 1130 in FIG. 11D may result. This shows white areas 1135 where pixels are not color compressed and black areas 1137 where they are compressed the most. Note that fewer in-gamut pixels are "punished" for being close to OOG pixels than in FIG. 11C.

The feathering embodiment of listing 3 constructs a feathered set of gmin values by taking the minimum of the surrounding gmin values times a feathering function. When two OOG areas are near each other this minimum function may produce cusps or discontinuities in the feathered gmin function, as the feathering functions cross each other. This effect may be visible to the human visual system, so it may be advisable to perform a final low-pass filtering operation over the resulting gmin values.

This suggests a possible alternate embodiment for calculating the feathered gmin values. The map 1130 in FIG. 11D looks somewhat like a low-pass filtered version of the map 1105 in FIG. 11B. However simply low-pass filtering the peak OOG values may not by itself produce a useful feathered gmin function. This is because a low-pass filter tends to decrease the effect of isolated gmin values or near the edges of large OOG areas. This may be addressed by first "broadening" the peak OOG areas with an algorithm like the one in listing 3bis below:

Listing 3bis

```
function dobroaden(x,y)
 local i,j
 local pos=1
 local gmin=255
 for j= -box_width,box_width do       --examine the surrounding area
  for i= -box_width,box_width do
   if bpass[pos]~=0 then              --if it is inside the low pass filter
    gmin=math.min(gmin,spr.fetch("peak",x+i,y+j))   --select the
                                                     minimum value
   end
   pos=pos+1
  end
 end
 spr.store("gmin",x,y,gmin)           --record that minimum
end)
```

This embodiment may be applied to each of the peak OOG values instead of the dofeather function. It may take the same peak OOG values and examine all the surrounding values that fall inside the effect of a low-pass filter (stored in a table named bpass). This makes isolated OOG values and edges "broader". Then the same low-pass filter may be applied to the resulting broadened gmin buffer to produce a filtered gmain function. The result may be very similar to the map 1130 of FIG. 11D.

Figure 11E:
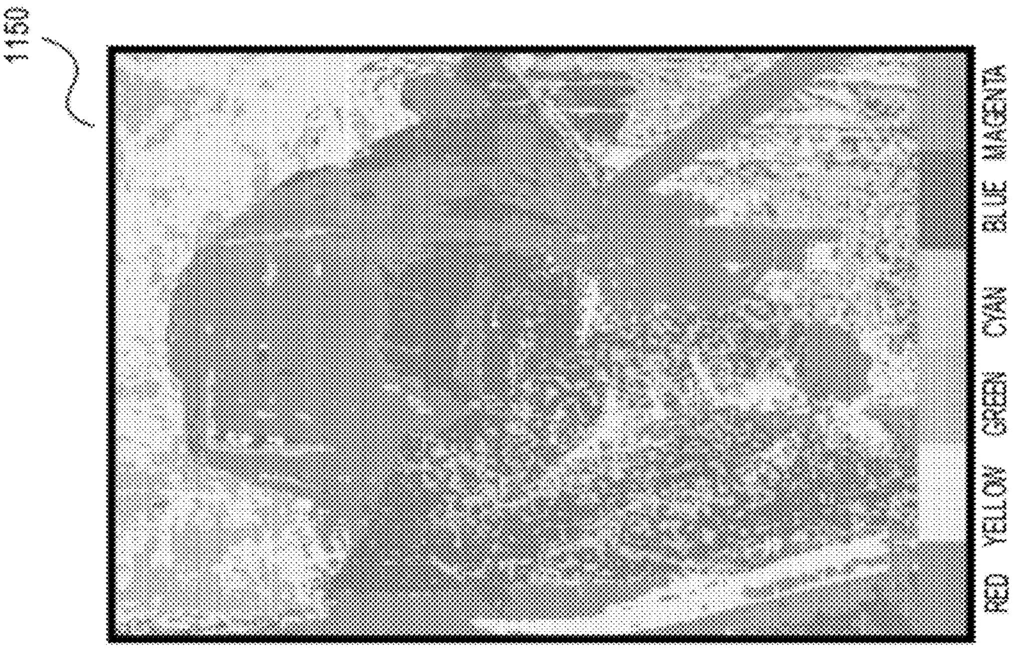
FIG. 11E shows the regions of FIG. 11A that fall into different color hue sections.
Figure 12D:
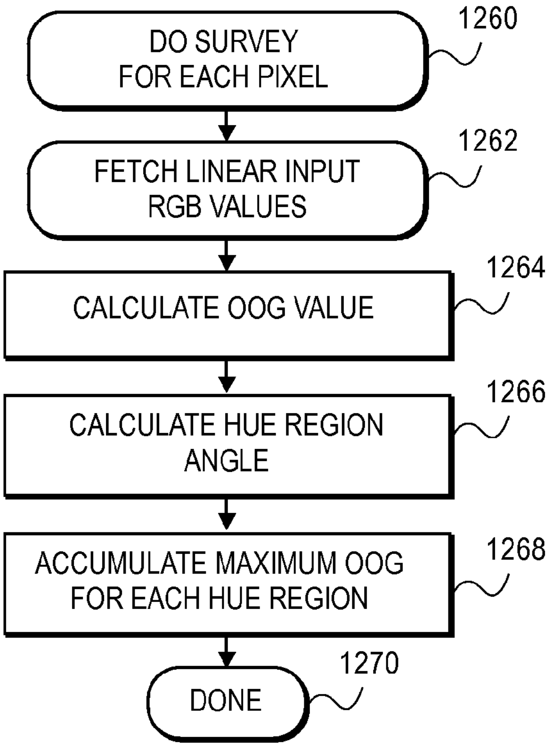
FIG. 12D is a flowchart showing surveying of chrominance based regions

The regions of the input image in the pseudo code described so far have all been surveyed in the spatial domain. In alternative embodiments, pixels may instead be surveyed in the chrominance domain. FIG. 11E shows a map 1150 of the image 1100 of FIG. 11A divided up into 6 color regions. Each different shade of gray in FIG. 11E represents one of the color wheel 900 sections 910 shown in FIG. 9A. FIG. 12D shows one embodiment of a method for performing a survey of the color of an image and calculating color compression factors for images. Steps 1260 through 1270 perform the techniques and process for finding the maximum OOG values for any given hue region in the image.

The pseudo-code below in listing 4 also gives an alternative embodiment:

Listing 4

```
function dosurvey(x,y)  -- survey one pixel and accumulate statistics
 local r,g,b=spr.fetch("ingam",x,y)  --fetch the linear data
 local minp = minRGBW(r,g,b)         --minimal RGBW GMA just to
                                       calculate OOG
```

-continued

Listing 4

```
local hue=calchue(r,g,b)                    --calculate the hue
peaks[hue]=math.max(peaks[hue],maxp)        --keep maximums in all
                                            hextants
end
```

Figure 9A:
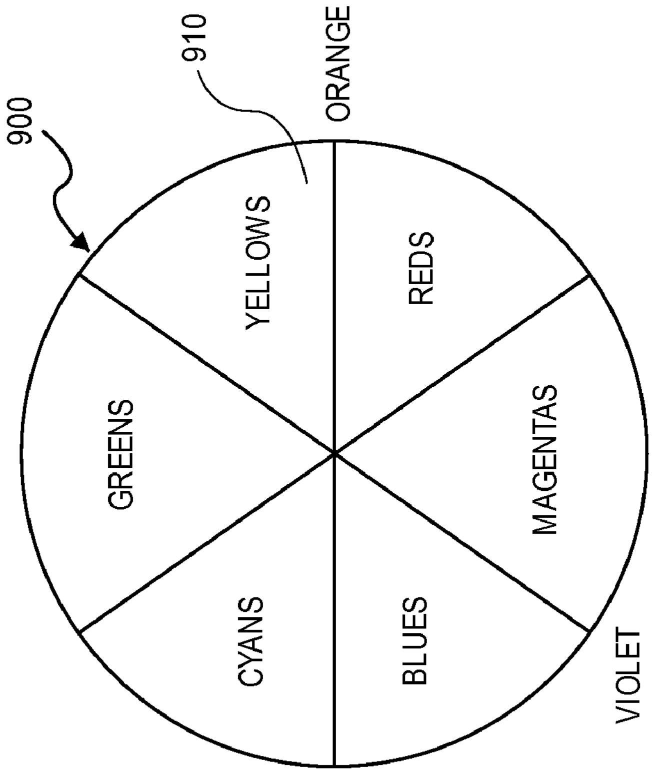
FIG. 9A is a diagram of the color hue circle divided into color triangle sectors
Figure 9B:
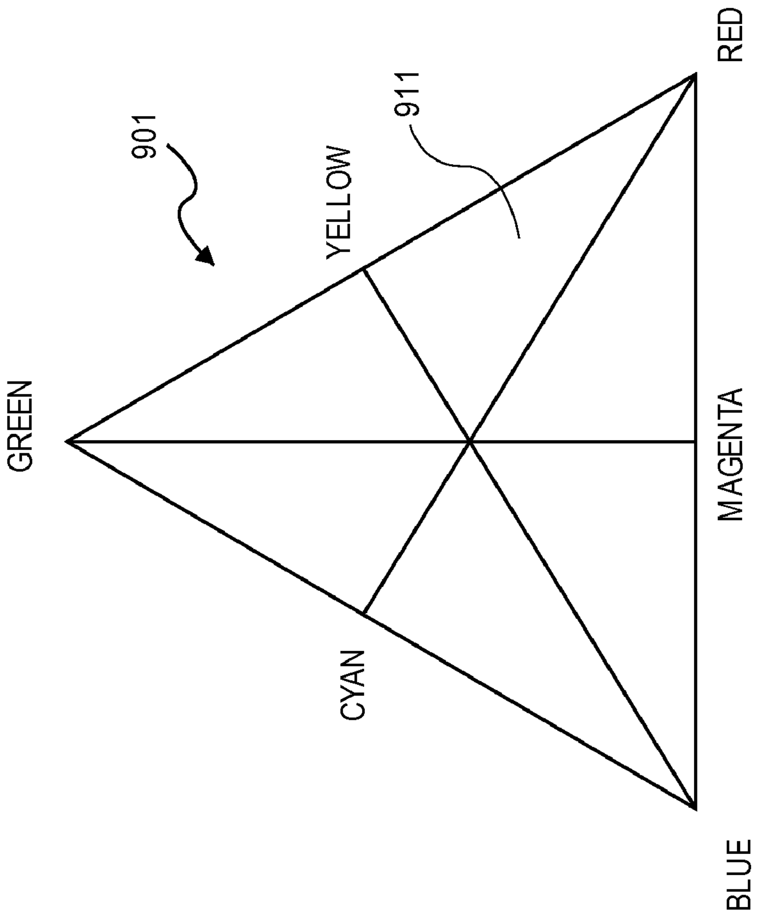
FIG. 9B is a color gamut triangle divided into color triangle sectors

This dosurvey routine may be called for every (or some reasonable subset thereof) input pixel in the image. It fetches the linear RGB data (after input gamma conversion), calculates the amount the pixel is OOG and the hue angle of the pixel. The minRGBW function in this embodiment returns a single value that is above a limit, MAXCOL, if the pixel is OOG and below or equal to MAXCOL if the pixel is in gamut. The calchue function in this case returns a number between 0 and 5 depending on whether the color is near red (0), yellow (1), green (2), cyan (3), blue (4) or magenta (5). FIG. 9A shows the color wheel 900 diagram for these colors. The peaks table is initialized to zero at the start of each image and by the time each pixel has been examined the table will contain the worst-case OOG value for each different wedge of the color wheel. For example, sample values for the image 1100 of FIG. 11A could be as shown below:

| Reds | Yellows | Greens | Cyans | Blues | Magentas |
|---|---|---|---|---|---|
| 8140 | 7440 | 4094 | 6306 | 6720 | 4094 |

In this example, MAXCOL could be 4095 so this indicates that Reds section is almost 2 times out of gamut somewhere in the image, the Yellows section is somewhat less OOG, the Greens section is in gamut everywhere in the image, the Cyans and Blues sections are less OOG than others and the Magentas section is not OOG anywhere in the image. The percentage that these values are above MAXCOL can be used to calculate a scaling factor to compress colors in each section 910 of the color wheel 900. Pixels close to Red would be compressed almost 50% while pixels close to Green would not be compressed at all.

Figure 12E:
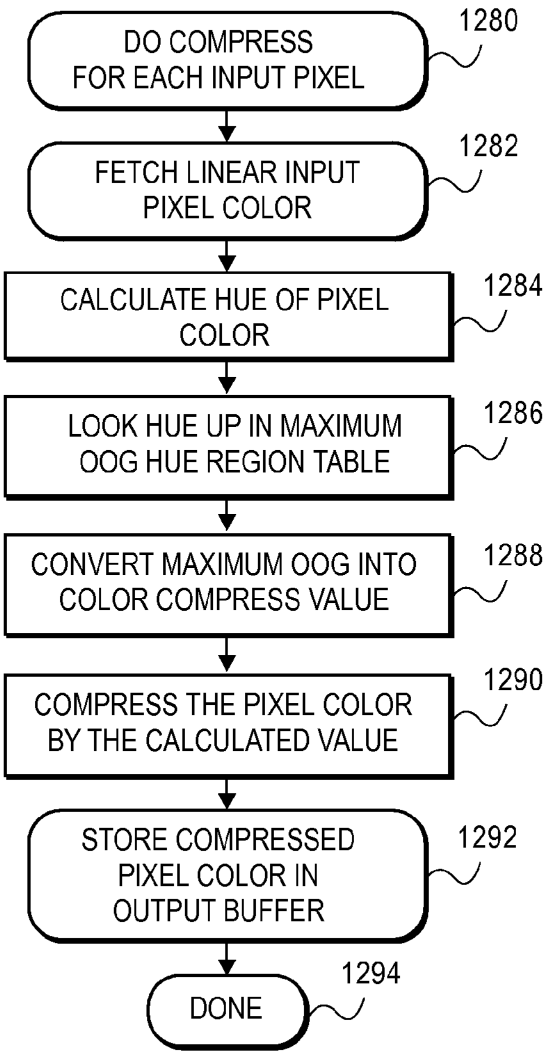
FIG. 12E is a flowchart showing compression of colors based on the hue survey of FIG. 12D.

FIG. 12E depicts one embodiment in flowchart form a compression technique. Steps 1280 through 1294 outline a process whereby pixel values may be compressed according to compression value derived from a maximum OOG within a hue/color region. The following pseudo-code gives an alternative embodiment:

```
Function docompress(x,y)       --do hue based color comression
  local r,g,b = spr.fetch("ingam",x,y)    --get linear input values
  local hue=calchue(r,g,b)                --calculate the hue again
  local gmin = 256                        --default to no gmin=1.0
  local peak=peaks[hue]                   --look up the peak OOG for this
                                          hue
  if peak>MAXCOL then                     --if the peak for this sextant is
                                          OOG,
    REG_GMIN =(MAXOOG-peak)*128/MAXCOL+128 --then
    calculate compression
  end
  local R,G,B = prescale(r,g,b,REG_GMIN)  --perform color
                                          compression
  spr.store("comp",x,y,R,G,B)             --save in output buffer
end
```

In this embodiment of docompress, the hue of the each input pixel may be calculated again and used to find the peak OOG value for that hue. The peak OOG value may be converted into a scaling factor between 256 and 128 which may cause the prescale function to compress colors between 0 and 50% towards black, depending on how OOG are the colors in that section 910 of the color wheel 900. It should be noted that no feathering may be needed here. This may be reasonable since discontinuities in the chrominance of natural images are difficult for the human eye to detect. Alternately, the hue angle may be calculated with finer resolution so that the distance from the center color of the region may be calculated. This color distance can then be used to interpolate the compression of colors between the regions. It should be noted that these examples divided the color space of images into 6 sections 910, but the resolution of hue can be divided into as many sections 910 as desired.

The above algorithm will tend to "punish" red pixels everywhere in the image even when the red OOG values are spatially localized. Thus, it may be desirable to combine spatial surveying with chroma surveying of the input image. In this case each spatial region 1010 of the image 1000 would have a separate peaks array that only contains the chroma peak values for local pixels. Then Red OOG values in one region would not punish the red values in other spatial regions.

What is claimed is:

1. A display system for rendering input image data onto a display, said display system comprising:

a display, said display comprising a subpixel repeating group, said group comprising colored subpixels of at least four colors, said display having a target gamut space;

a selective compression unit coupled to the display, said unit surveying said input image data to produce intermediate image data wherein said intermediate image data is a function of a segmentation of the input image data according to a parameter which provides one or more of spatial segmentation and temporal segmentation; and a gamut mapping unit coupled to the selective compression unit for mapping said intermediate image data onto image data that is renderable upon the target gamut of said display comprising said subpixel repeating group.

2. The display system as recited in claim 1 wherein said selective compression unit further comprises:

an out-of-gamut (OOG) survey unit for surveying input image data and detecting out of gamut colors in the target gamut of said display;

a segmentation unit that determines which segment of the input image said out of gamut colors reside, wherein said input image comprises a set of segments, said segments determined according to the parameter; and a scaling map that determines a reduction amount to apply to out of color gamut color depending upon said segment in which said out of color gamut resides.

3. The display system as recited in claim 2 wherein said parameter is at least one selected from the group consisting of spatial segments, chromatic segments and temporal segments.

4. The display system as recited in claim 2 wherein said selective compression unit further comprises:

a selective reduction unit for applying said reduction amount to said out-of-color gamut image data.

5. The display system as recited in claim 4 wherein said reduction amount substantially maintains local contrast of the input image data.

6. The display system as recited in claim 5 wherein said reduction amount substantially maintains local contrast of the input image data within said segment of said out-of-gamut image data.

7. A display system for rendering input image data onto a display, said display system comprising:

a display, said display substantially comprising a subpixel repeating group, said group comprising colored subpixels of at least four colors, said display having a target gamut space;

a gamut mapping unit coupled to said display for mapping said input image data onto image data that is substantially renderable upon the target gamut of said display comprising said subpixel repeating group; and a selective compression unit coupled to said gamut mapping unit, said selective compression unit surveying said image data to produce intermediate image data wherein said intermediate image data is a function of a segmentation of the input image according to a parameter which provides one or more of spatial segmentation and temporal segmentation.

8. The display system as recited in claim 7 wherein said selective compression unit further comprises:

an out-of-gamut (OOG) survey unit for surveying image data and detecting out of gamut colors in the target gamut of said display;

a segmentation unit that determines which segment of the image said out of gamut colors reside, wherein said input image comprises a set of segments, said segments determined according to the parameter; and a scaling map that determines a reduction amount to apply to out of color gamut color depending upon said segment in which said out of color gamut resides.

9. The display system as recited in claim 8 wherein said parameter is at least one selected from the group consisting of spatial segments, chromatic segments and temporal segments.

10. The display system as recited in claim 8 wherein said selective compression unit further comprises:

a selective reduction unit for applying said reduction amount to said out-of-color gamut image data.

11. The display system as recited in claim 10 wherein said reduction amount substantially maintains local contrast of the input image data.

12. The display system as recited in claim 11 wherein said reduction amount substantially maintains local contrast of the input image data within said segment of said out-of-gamut image data.

13. The display system of claim 1 and further comprising:

a clamping unit operatively coupled to the gamut mapping unit and configured for clamping output signals of the gamut mapping unit such that the clamp unit output signals represent only colors and luminances within the target gamut space.

* * * * *